(12) United States Patent
Gandert et al.

(10) Patent No.: US 10,242,089 B2
(45) Date of Patent: *Mar. 26, 2019

(54) METHOD AND SYSTEM FOR SEARCHING FOR DIGITAL ASSETS

(71) Applicant: Getty Images (US), Inc., New York, NY (US)

(72) Inventors: Nate Gandert, Seattle, WA (US); Chris Ziobro, Seattle, WA (US); Evan Cariss, Seattle, WA (US); Mary Forster, Seattle, WA (US); Mary Pat Gotschall, Seattle, WA (US); Joy Moffatt, Seattle, WA (US); Jeff Oberlander, Seattle, WA (US); Jenny Blackburn, Seattle, WA (US); Debbie Cargile, Seattle, WA (US); Aaron Kraemer, Seattle, WA (US)

(73) Assignee: Getty Images (US), Inc., New York, NY (US)

( * ) Notice: Subject to any disclaimer, the term of this patent is extended or adjusted under 35 U.S.C. 154(b) by 392 days.

This patent is subject to a terminal disclaimer.

(21) Appl. No.: 15/012,729

(22) Filed: Feb. 1, 2016

(65) Prior Publication Data

US 2016/0253410 A1 Sep. 1, 2016

Related U.S. Application Data

(63) Continuation of application No. 12/131,786, filed on Jun. 2, 2008, now Pat. No. 9,251,172.

(60) Provisional application No. 60/941,582, filed on Jun. 1, 2007.

(51) Int. Cl.
G06F 17/30 (2006.01)

(52) U.S. Cl.
CPC .... *G06F 17/30672* (2013.01); *G06F 17/3064* (2013.01); *G06F 17/30265* (2013.01); *G06F 17/30646* (2013.01); *G06F 17/30663* (2013.01); *G06F 17/30734* (2013.01); *G06F 17/30737* (2013.01)

(58) Field of Classification Search
CPC .......... G06F 17/30265; G06F 17/3064; G06F 17/30672; G06F 17/30734; G06F 17/30737; G06F 17/30646; G06F 17/30663
USPC ............ 707/999.003, 999.005, E17.009, 999
See application file for complete search history.

(56) References Cited

U.S. PATENT DOCUMENTS 6,144,968 A * 11/2000 Zellweger ......... G06F 17/30265
6,247,009 B1 * 6/2001 Shiiyama ......... G06F 17/30265
(Continued)

*Primary Examiner* — Shiow-Jy Fan
(74) *Attorney, Agent, or Firm* — Perkins Coie LLP

(57) ABSTRACT

A method of presenting digital assets in response to a search query by a user to locate at least one digital asset from a database of digital assets is described. Each digital asset has at least one keyword associated with it, and each associated keyword is part of a hierarchical organization of keywords. A first set of digital assets that have associated keywords equivalent to the search query is identified as well as suggested keywords that have e.g., an ancestor, descendant or sibling relation to the search query. The digital assets and the suggested keywords are presented to the user. The user selects a suggested keyword, and a second set of digital assets that have associated keywords equivalent to the suggested keyword is identified. The second set of digital assets is presented to the user.

21 Claims, 18 Drawing Sheets

(56) References Cited

U.S. PATENT DOCUMENTS

| | | | |
|---|---|---|---|
| 6,519,586 B2* | 2/2003 | Anick | G06F 17/30864 |
| | | | 704/9 |
| 2002/0091661 A1* | 7/2002 | Anick | G06F 17/30864 |
| 2004/0111465 A1* | 6/2004 | Chuang | H04L 29/06 |
| | | | 709/203 |
| 2004/0267740 A1* | 12/2004 | Liu | G06F 17/30256 |
| 2006/0015489 A1* | 1/2006 | Probst | G06F 17/30038 |
| 2006/0248078 A1* | 11/2006 | Gross | G06F 17/3064 |

* cited by examiner

METHOD AND SYSTEM FOR SEARCHING FOR DIGITAL ASSETS

CROSS-REFERENCE TO RELATED APPLICATION(S)

This application is a continuation of U.S. patent application Ser. No. 12/131,786, now granted U.S. Pat. No. 9,251,172, entitled "METHOD AND SYSTEM FOR SEARCHING FOR DIGITAL ASSETS," filed Jun. 2, 2008, which claims the benefit of priority to U.S. Provisional Application No. 60/941,582, entitled "METHOD AND SYSTEM FOR SEARCHING FOR IMAGES," filed Jun. 1, 2007, all of which are incorporated herein by reference in their entireties.

BACKGROUND

In a typical image search, a user specifies one or more search terms in order to locate images corresponding to the search terms. An image typically has metadata associated with it. An image search generally works by examining the associated metadata to determine if the metadata match a user-specified search term. Typically, images for which the associated metadata match a user-specified search term are then returned to the user.

One problem that a typical image search poses is that an image is unlikely to have associated metadata that adequately describe the image. It has been said that a picture is worth a thousand words. However, it is unlikely that an image has such a large amount of associated metadata. Even if an image has such a large amount of associated metadata, it is unlikely that the individual elements of the associated metadata would combine in a coherent manner to evoke the same response in a user that viewing the image may evoke.

Accordingly, a system that allows a user to search for images by a method that improves upon a typical image search would have significant utility.

DETAILED DESCRIPTION

Figure 1:
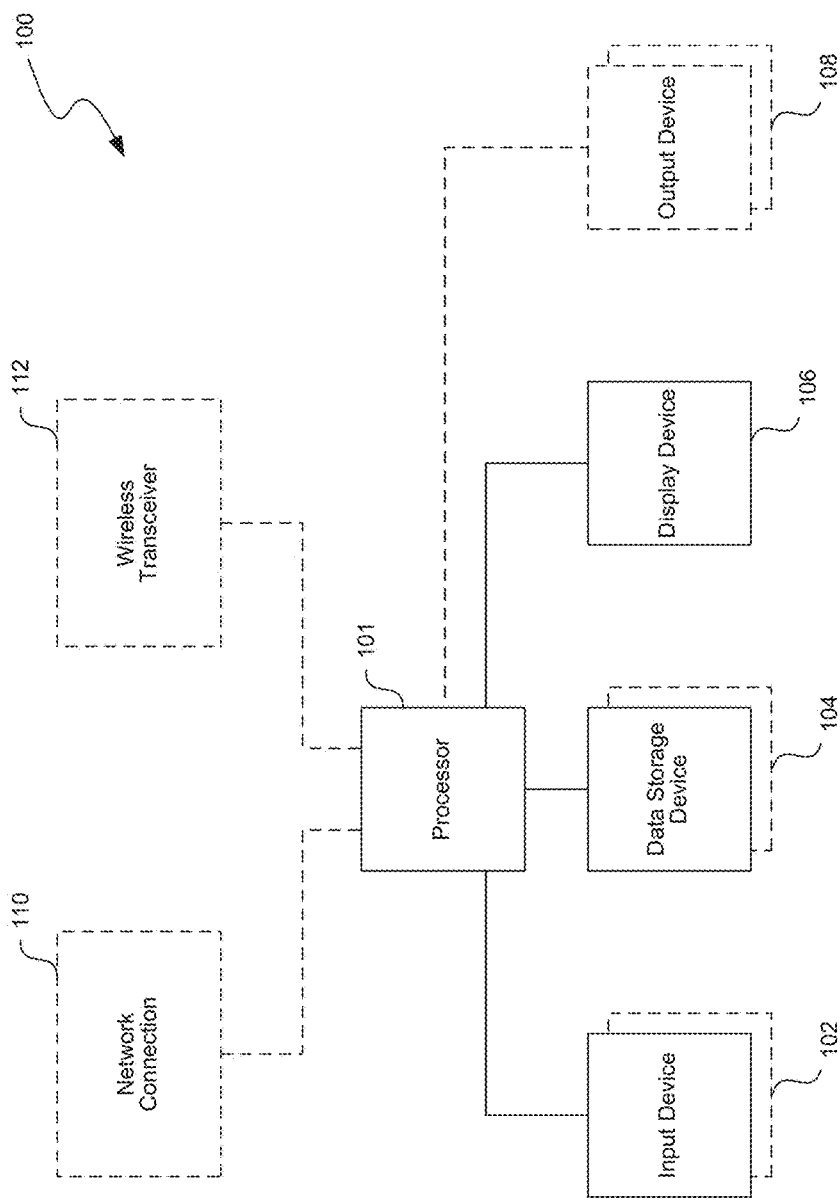
FIG. 1 is a block diagram of a suitable computer that may employ aspects of the invention.

A software and/or hardware facility for searching for digital assets, such as images, is disclosed. The facility provides a user with a visual and tactile or visual with mixed metadata method of searching for relevant images. The facility allows a user to specify one or more search terms in an initial search request. The facility may return images and terms or keywords in response to the initial search request that are intended to be both useful and inspirational to the user, to enable the user to brainstorm and find inspiration, and to visually locate relevant images. For purposes of this description the words "term" or "keyword" can include a phrase of one or more descriptive terms or keywords. In some embodiments, the facility locates images and/or terms that are classified in a structured vocabulary, such as the one described in U.S. Pat. No. 6,735,583, assigned to Getty Images, Inc. of Seattle, Wash., entitled METHOD AND SYSTEM FOR CLASSIFYING AND LOCATING MEDIA CONTENT, the entirety of which is hereby incorporated by reference. The structured vocabulary may also be referred to as the controlled vocabulary. The facility allows the user to refine or expand the initial search by specifying that some of the returned images and/or terms shall or shall not become part of a subsequent search. The facility allows the user to continue refining or expanding subsequent searches reiteratively or to start over with a new initial search. The facility can also be used to search for other types of digital assets, such as video files, audio files, animation files, other multimedia files, text documents, text strings, keywords, or other types of documents or digital resources.

In the following description, like numerals refer to like elements throughout. The terminology used in the description presented herein is not intended to be interpreted in any limited or restrictive manner, simply because it is being utilized in conjunction with a detailed description of certain specific embodiments of the invention. The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

The following description provides specific details for a thorough understanding and enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. Furthermore, embodiments of the invention may include several novel features, no single one of which is solely responsible for its desirable attributes or which is essential to practicing aspects of the inventions herein described.

The facility provides the user with an interface that allows the user to search for images and view images and/or terms returned in response to the user's request. In some embodiments, the interface consists of a search region and three additional regions. The facility permits the user to specify one or more search terms in the search region. The facility places images and/or terms that are responsive to the search terms in the first additional region, which may be called the "Inspiration Palette." The facility allows the user to place some of the returned images and/or terms in the second additional region, which may be called the "Action Palette." The facility places images returned in response to the user's initial search and to subsequent searches in the third additional region, which may be called the "Reaction Palette."

The facility may allow the user to specify a single search term or multiple search terms in the search region. The facility may provide the user with the ability to select one or more categories in order to filter their initial and subsequent search results. A filter may be selected by techniques well-known in the art, such as by a drop-down list or radio buttons. The categories may be represented by labels corresponding to pre-defined groups of users to which use of the facility is directed, such as "Creative," "Editorial," or "Film." The facility may require the user to specify a filter before requesting a search or the facility may allow the user to specify a filter or change or remove a specified filter after requesting a search. If the user specifies a filter, the facility may return unfiltered images and/or terms but place only filtered images and/or terms in the Inspiration Palette and/or Reaction Palette. The facility may do so in order to avoid re-running a search with a different filter, thus allowing a user to change filters in real time. Or, the facility may return and place only filtered images. The facility may choose one method or alternate between the two, depending upon user and system requirements. The facility may also allow the user to choose to perform a new initial search or to refine or expand an initial search by specifying one or more additional search terms. In some embodiments the facility may permit the user to specify that the facility return only images, or return only terms, or to return both images and/or terms.

In some embodiments, the facility may suggest search terms in response to user input, especially ambiguous user input. For example, when the user enters a search term, the facility may show terms from the structured vocabulary that are associated with or that match that search term. The facility may suggest terms while the user is entering text, such as an "auto-complete" feature does, or the facility may suggest terms after the user has finished entering text. In such a way the facility may conform the user search term to a term in the structured vocabulary that it matches or is synonymous with. In some embodiments, the facility may use, e.g., a red star to indicate a direct match of the search term, and a grey star to indicate a more distant association, as indicated by the structured vocabulary. Or, the facility may provide other visual, audible or other indications to show direct matches of search terms or other associations as indicated by the structured vocabulary. In some embodiments the facility may maintain a history of search terms for each user. The facility may then use techniques well-known in the art, such as a drop-down list, to display the search terms to the user in the search region. This allows the user to easily re-run stored searches.

Inspiration Palette

The facility places images and/or terms that are responsive to an initial search in the Inspiration Palette. In some embodiments, the facility returns images and/or terms that it locates based upon their classifications in the structured vocabulary hierarchy. The facility returns images and/or terms that directly match the user search term or are synonymous with the user search term. In addition to those direct matches, the facility may return images and/or terms related to the direct matches, based upon their classifications in the structured vocabulary. For example, the facility may return images and/or terms from the structured vocabulary hierarchy that are parents, children or siblings of the direct matches. The facility may also return images and/or terms that represent other categories by which the user may further refine an image search. These other categories may represent effectively binary choices, such as black and white or color, people or no people, indoors or outdoors. For example, the facility may return the term "black and white." If the user specifies that "black and white" shall become part of a subsequent search, the facility will only return images that are in black and white. In general the facility returns a broader set of images and/or terms than would be returned in a typical keyword image search that returns images having metadata/tags that match the keywords. The facility may return and place in the Inspiration Palette all relevant images and/or terms or some subset of the relevant images and/or terms. The facility may also return and place in the Inspiration Palette a random sampling of images and/or terms. The facility may also return and place in the Inspiration Palette images and/or terms based upon their popularity, i.e., the frequency with which they are selected as matching the search term, their association with popular search terms, or images based on the frequency with which terms match them. If the facility cannot display all of the images and/or terms in the Inspiration Palette the facility may provide the user with the ability to move sequentially within the search results, such as by using a scrollbar or paginating through the search results. Alternatively, the facility may provide the user with the ability to either "shuffle" or "refresh" the search results, so as to have displayed different images and/or terms.

In some embodiments, the facility returns images and/or terms from data pools formed from various data sources. A data pool is a collection of images and/or terms. The facility may form the following data pools from the structured or controlled vocabulary data source: identity (the term corresponding to the initial search term), parents, ancestors, siblings, children, and related terms. The facility may form the following data pools from the refinement terms data source: concepts, subjects, locations, age and others, such as number of people in the image or the gender of image subjects. The facility may form data pools from any metadata item that describes an image. The facility may form from other data sources the following data pools: popular search terms, which may be based upon search terms most often entered by users; popular terms; which may be based upon terms most often applied to images; usual suspects, which may be images and/or terms that are often beneficial to the user in filtering a search; and reference images, which may be images that match terms in the structured or controlled vocabulary. The facility may form other data pools from other data sources, such as database data, static data sources, data from data mining operations, web log data and data from search indexers. The facility may form the data pools periodically according to a schedule or as instructed by an administrator of the facility.

In some embodiments, the usual suspects data pool includes images and/or terms that are returned because they may be useful to the user in filtering search results. The facility may use terms from the usual suspects data pool in conjunction with the refinement terms in order to provide more relevant images and/or terms that fall within the usual suspects data pool.

The facility may also maintain categories or lists of excluded images and/or terms that are not to be returned in response to a user search. Excluded images and/or terms may include candidate images and/or terms; images and/or terms that are marked with a certain flag; terms that are not applied to any images; terms that fall within a certain node of the structured vocabulary hierarchy; and images and/or terms that are on a manually-populated or automatically-populated exclusion list. The facility may also apply rules to exclude images and/or terms from being returned in response to a user search. An example rule may be that if an image and/or term has a parent in a particular data pool then images and/or terms from certain other data pools are not to be returned.

Figure 5A:
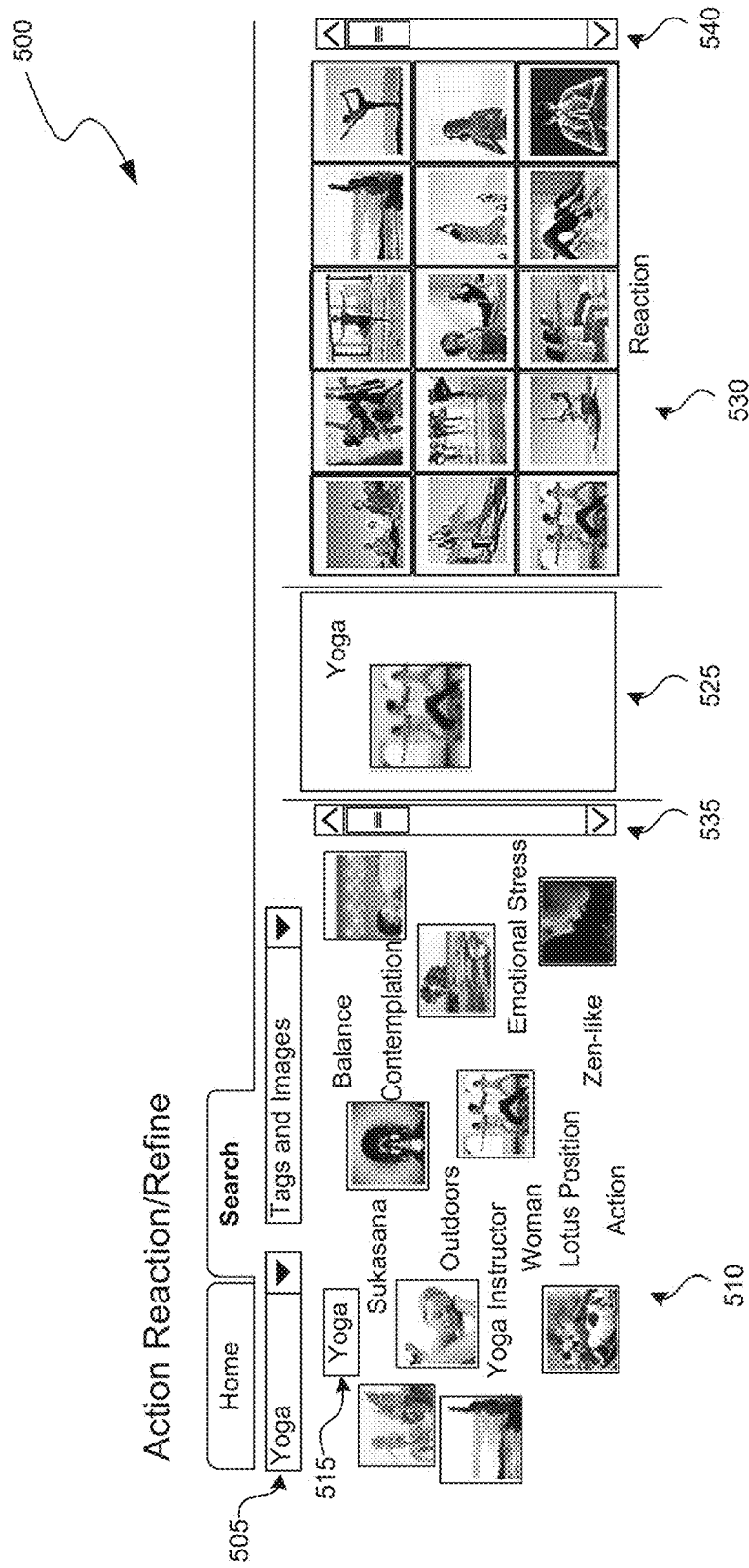
FIG. 5A depicts an interface in which an initial search has been refined.
Figure 5B:
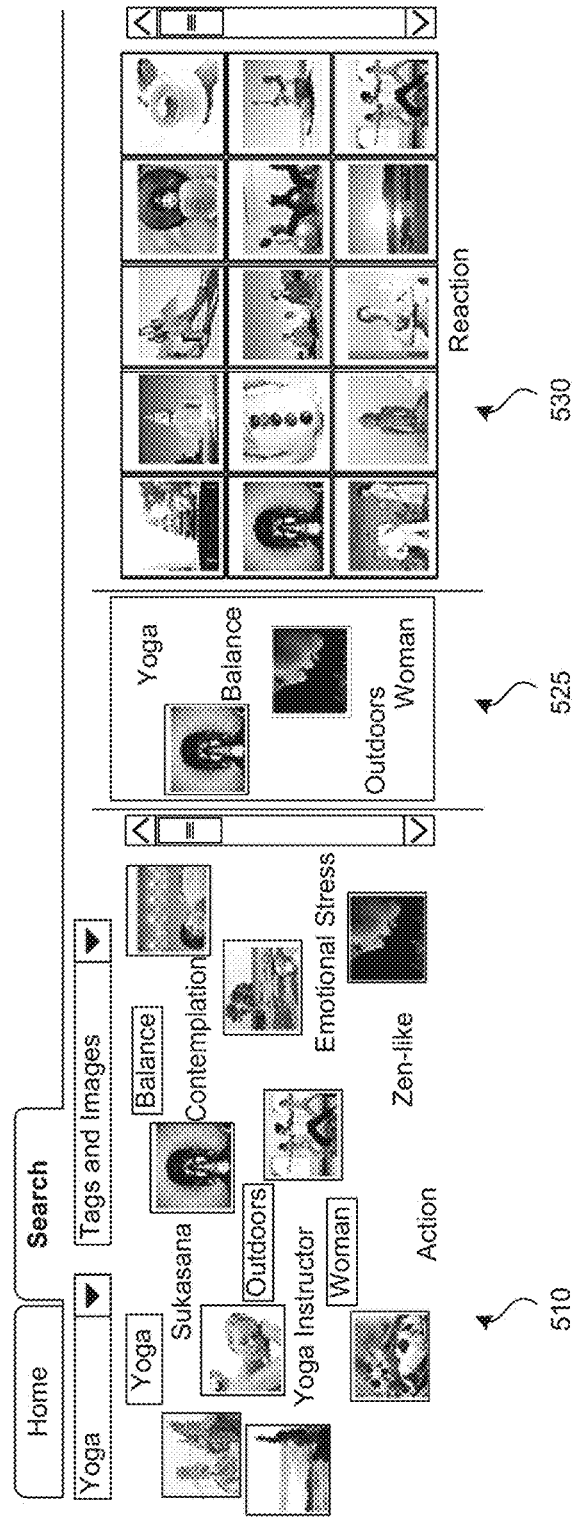
FIG. 5B depicts the interface in which subsequent refinements to the initial search have been made.

In some embodiments, the facility places returned images and/or terms in the Inspiration Palette in a "tag cloud," which is a distribution based upon the size and position of the images and/or terms based upon their location in the structured vocabulary, as shown in FIGS. 5A and 5B. Or, the facility may order images and/or terms in the Inspiration Palette based upon one or more factors, such their location in the structured vocabulary, a result count, alphabetically, or the "popularity" of images and/or terms, as determined by the facility. The facility may allow the user to specify how the facility shall place returned images and/or terms, such as by specifying that images shall be ordered in a left column and terms in a right column. The facility may increase or decrease the font size of returned terms in accordance with their proximity to matching terms in the structured vocabulary. For example, a returned term that is an immediate parent of the matching term may have a larger font size than a returned term that is a more distant parent. Or, the facility may determine the font size of a returned term based upon the number of associated returned images. The facility may vary the size of returned images in a like manner. Images and/or terms of varying sizes may be placed in the Inspiration Palette based upon their sizes, with the largest images and/or terms in the upper left corner and proceeding down to the smallest images and/or terms in the lower right corner. Alternatively, the images and font sizes may be randomly arrayed to facilitate creativity. In some embodiments, the facility apportions weights to the results returned by a particular image and/or term. The facility may then place the returned images and/or terms in the Inspiration Palette in accordance with their apportioned weights.

The facility may associate contextual menus with returned images and/or terms in the Inspiration Palette. The facility may display a contextual menu in response to a user indication such as a mouse click or rollover. A contextual menu may display to the user various options, such as: 1) view greater detail about the image and/or term; 2) see the terms associated with the image and/or term; 3) add the image and/or term to the Action Palette; 4) find similar images and/or terms; 5) remove the image and/or term from the search results; and 6) add the image to a shopping cart or "light box" for possible purchase or license. Other options may be displayed in the contextual menu. Alternatively, the facility may display to the user an interface that contains greater detail about an image and/or term in response to a user indication such as a mouse click. An image may be categorized and the facility may display other attributes or actions based on or determined by the image's categorization. If the facility displays to the user the terms associated with an image and/or term, the facility may order the displayed associated terms in accordance with the initial search terms. I.e., the facility may weight the associated terms so as to allow the user to locate relevant images.

Action Palette

The facility allows the user to place some of the returned images and/or terms in the Action Palette. By doing so, the user effectively changes their initial search results. This is because each image has a primary term associated with it. By placing an image in the Action Palette, the user specifies that the associated primary term shall become part of the subsequent search. The facility may also form the subsequent search in other ways, such as by adding both primary and secondary terms, by allowing the user to choose which terms to add, or by adding terms according to a weighting algorithm. The facility allows the user to place an image and/or term in the Action Palette using the technique known as "drag-and-drop." The facility may allow the user to indicate by other means that an image and/or term is to be placed in the Action Palette by other means, such as keyboard input or selection via an option in a contextual menu as described above. The facility may allow the user to simultaneously place several images and/or terms in the Action Palette. In some embodiments, the Action Palette is further divided into two sub-regions. For images and/or terms placed in the first sub-region, the facility may add the associated terms to the initial search using a Boolean "AND." Conversely, terms associated with images and/or terms placed in the second sub-region may be added to the initial search using a Boolean "NOT." In some embodiments, the Action Palette region contains a third sub-region that corresponds to a Boolean "OR," and the associated terms of images and/or terms placed in this third sub-region may be added to the initial search using a Boolean "OR." The Boolean "OR" sub-region enables a user to expand instead of refine an image search. In some embodiments, when the user places an image and/or term from the Inspiration Palette in the Action Palette, the facility does not replace the moved image and/or term in the Inspiration Palette but instead leaves a blank space. In some embodiments the facility replaces the moved image and/or term with another image and/or term.

In some embodiments, the facility allows the user to indicate the importance of images and/or terms added to the Action Palette. This may be done by allowing the user to order images and/or terms within the Action Palette, or by some other method that allows the user to specify a ranking of images and/or terms, such as by positioning or sizing the images and/or terms or by providing a weighting or ranking value. In some embodiments, the facility allows the user to specify the terms associated with an image that shall become part of the subsequent search. For example, an image of a yoga mat in a windowed room may have the primary term "yoga" associated with it as well as the secondary term "window." The facility may allow the user to specify that "yoga," "window," or another associated term shall become part of the subsequent search. The facility may also allow the user to specify additional terms by other than dragging and dropping images and/or terms in the Action Palette. This may be done, for example, by allowing the user to select the Action Palette and manually enter a term, such as by typing a term into a text box that is displayed proximate to the Action Palette.

Once the user has placed an image and/or term in the Action Palette, the facility may perform a subsequent search that changes the user's initial search. In some embodiments the facility may cache the result set returned in response to the initial search, and subsequent searches may search within or filter the cached result set, thereby allowing the facility to forego performing a new search. This allows the user to refine or narrow the initial search. The facility may cache result sets for other purposes, such as to allow faster pagination within results or to more quickly display images and/or terms in the Inspiration Palette, Action Palette or Reaction Palette. In some embodiments, an entirely new search is performed in response to the subsequent search query.

In some embodiments, if the user specifies additional search terms in the search region the facility does not remove images and/or terms in the Action Palette and does not clear images in the Reaction Palette. The facility may provide a button or other control that allows the user to direct the facility to clear the Action Palette, the Reaction Palette, and/or the Inspiration Palette.

The user may drag-and-drop images and/or terms out of the Action Palette to remove their associated terms from subsequent searches. The facility may then place removed images and/or terms in the Inspiration Palette to make them available for future operations. The facility may allow the user to drag-and-drop images and/or terms from any palette region to any other palette region, such as from the Reaction Palette to the Inspiration Palette or from the Inspiration Palette to the Reaction Palette.

Reaction Palette

Images returned in response to an initial search and to subsequent searches are displayed in the Reaction Palette. The facility may place an image in the Reaction Palette as soon as it is returned in order to indicate to the user that a search is ongoing. Alternatively, the facility may wait until all images are returned before placing them in the Reaction Palette in one batch. The user may be able to specify the size of the images displayed in the Reaction Palette, such as by specifying either a small, medium or large size. Alternatively, the size may be automatically varied among the images based on the estimated responsiveness to the search query.

If the user specifies more than one search term in the initial search, then the facility returns images with associated terms that match any of the user-specified search terms or any combination thereof. The facility sorts returned images in order of most matching terms and places them in the Reaction Palette. For example, if a user specifies four search terms A, B, C, and D, the facility would return all images with associated terms that match either A, B, C, or D, or any combination thereof, such as A, B, and C; B and D; or individually A; B; C; or D. The facility would place in the Reaction Palette first the images that match all four search terms, then the images that match any combination of three search terms, then the images that match any combination of two search terms, then the images that match any individual search term. Alternatively, the facility may sort returned images by other factors, such as the date of the image or the copyright, other rights holder information, or perceived responsiveness to the search query.

The facility may associate contextual menus with images in the Reaction Palette and display the contextual menus in response to a user indication. Such contextual menus may offer options similar to those previously discussed as well as additional options, such as: 1) view the purchase or license price; 2) mark the image as a favorite; 3) view more images like the selected image or 4) view image metadata, such as the caption, photographer or copyright. Other options may be displayed in the contextual menu. If the user chooses the option to view more images like the selected image, the facility may display a different set of images taken from the larger set of returned images, or the facility may perform a new search incorporating the primary term associated with the selected image. Alternatively, the facility may permit the user to specify whether to display a different set of images or to perform a new search.

The facility may also zoom the image or otherwise allow the user to preview the image in response to a user indication, such as a mouse rollover. The facility may also permit the user to drag-and-drop images to a "light box" or shopping cart region or icon for potential purchase or license.

In some embodiments, the facility may allow the user to drag-and-drop an image from the Reaction Palette to the Action Palette so as to permit the user to request more images like the moved image. The facility may also allow the user to drag-and-drop images and/or terms from the Inspiration Palette, the Action Palette or the Reaction Palette to the search region. This allows the facility to identify images more like the moved image by searching for images and/or terms with associated terms that are similar to the associated terms of the images and/or terms moved into the search region.

In certain situations, the search query corresponding to the images and/or terms specified by the user may be such that the facility returns no results. In some embodiments, the facility may present a message to the user indicating that there are no results and suggest to the user possible changes. The user may then drag-and-drop images and/or terms from the Action Palette to the Inspiration Palette, or within the different sub-regions of the Action Palette, in order to change the search query. In some embodiments, the facility provides only images and/or terms in the Inspiration Palette that will return results when added to the user's search query. In some embodiments, the facility may return a standard set of images and/or terms in response to a search query that would otherwise return no results.

In order to learn user preferences, the facility may ask the user questions during the search process, such as why the user has selected a particular image. The facility could also request that the user rank selected images or ask the user to select a favorite image. The facility may do so in an attempt to provide the user with more control over the search process and results, or in order to provide images and/or terms in the Inspiration Palette that better match the user's search terms. The facility may also display in the search region the actual query corresponding to the user's search and subsequent refinements so as to provide the user with more control over the search process and results.

The facility supports digital assets, such as images, regardless of image content, classification, image size, type of image (e.g., JPEG, GIF, PNG, RAW or others) or other image attributes or characteristics. The facility also supports other types of digital assets, such as video files, audio files, animation files, other multimedia files, text documents, or other types of documents or digital resources. In some embodiments the facility displays only images that fall into one or more classifications, such as "Editorial," "Creative," or "Film." For example, images that are classified as "Editorial" may be images of one or more individuals who are well-known to the public. The facility may associate certain biographical information as terms with such images so as to permit the user to identify images of named individuals with varying career or personality aspects.

Suitable System

FIG. 1 and the following discussion provide a brief, general description of a suitable computing environment in which the invention can be implemented. Although not required, aspects of the invention are described in the general context of computer-executable instructions, such as routines executed by a general-purpose computer, e.g., a server computer, wireless device or personal computer. Those skilled in the relevant art will appreciate that the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer,"

"system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Turning to the figures, FIG. 1 depicts one embodiment of the invention that employs a computer 100, such as a personal computer or workstation, having one or more processors 101 coupled to one or more user input devices 102 and data storage devices 104. The computer is also coupled to at least one output device such as a display device 106 and one or more optional additional output devices 108 (e.g., printer, plotter, speakers, tactile or olfactory output devices, etc.). The computer may be coupled to external computers, such as via an optional network connection 110, a wireless transceiver 112, or both.

The input devices 102 may include a keyboard and/or a pointing device such as a mouse. Other input devices are possible such as a microphone, joystick, pen, game pad, scanner, digital camera, video camera, and the like. The data storage devices 104 may include any type of computer-readable media that can store data accessible by the computer 100, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network such as a local area network (LAN), wide area network (WAN) or the Internet (not shown in FIG. 1).

Figure 2:
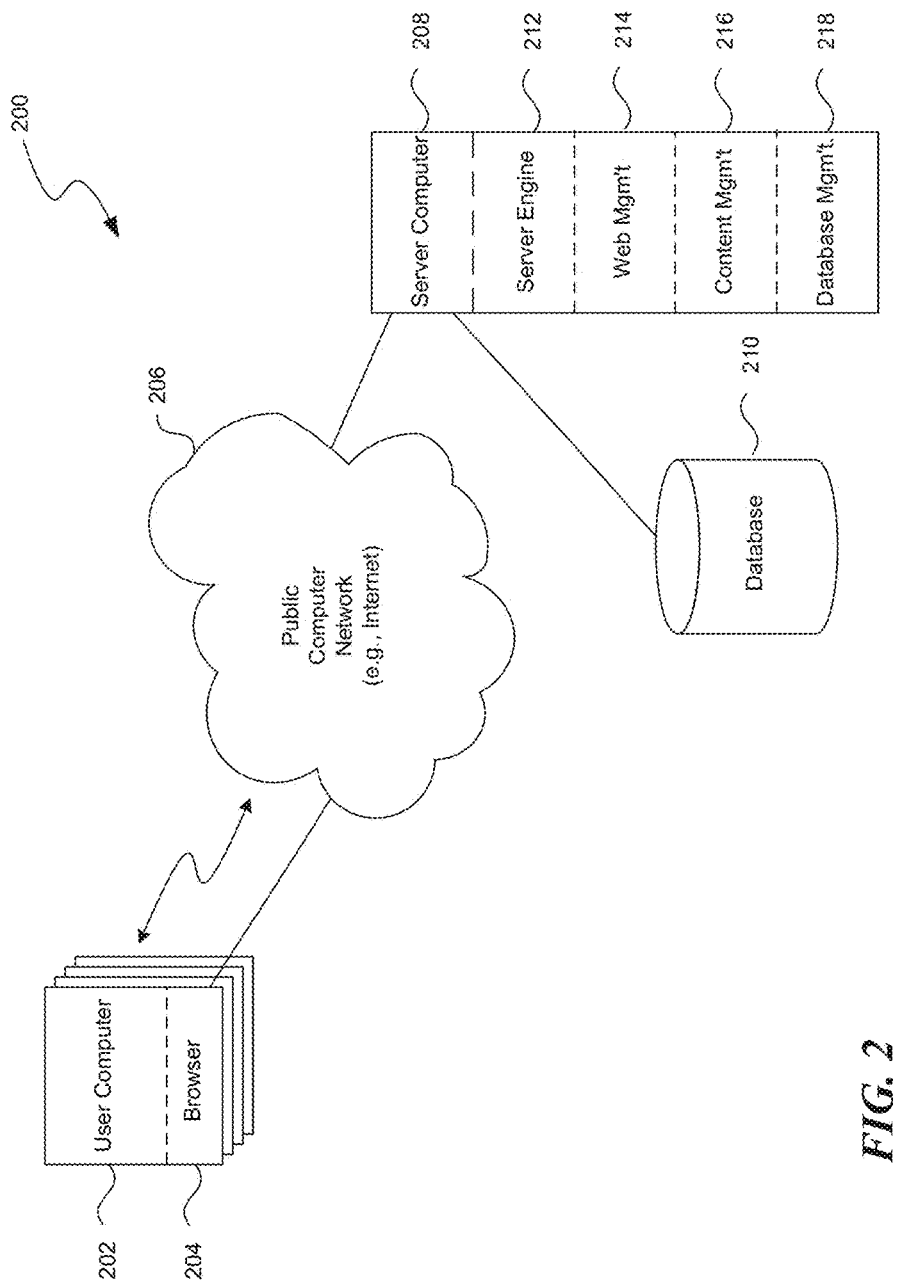
FIG. 2 is a block diagram illustrating a suitable system in which aspects of the invention may operate in a networked computer environment.

Aspects of the invention may be practiced in a variety of other computing environments. For example, referring to FIG. 2, a distributed computing environment with a web interface includes one or more user computers 202 in a system 200 are shown, each of which includes a browser program module 204 that permits the computer to access and exchange data with the Internet 206, including web sites within the World Wide Web ("Web") portion of the Internet. The user computers may be substantially similar to the computer described above with respect to FIG. 1. User computers may include other program modules such as an operating system, one or more application programs (e.g., word processing or spread sheet applications), and the like.

The computers may be general-purpose devices that can be programmed to run various types of applications, or they may be single-purpose devices optimized or limited to a particular function or class of functions. More importantly, while shown with web browsers, any application program for providing a graphical user interface to users may be employed, as described in detail below; the use of a web browser and web interface are only used as a familiar example here.

At least one server computer 208, coupled to the Internet or Web 206, performs much or all of the functions for receiving, routing and storing of electronic messages, such as web pages, audio signals, and electronic images. While the Internet is shown, a private network, such as an intranet may indeed be preferred in some applications. The network may have a client-server architecture, in which a computer is dedicated to serving other client computers, or it may have other architectures such as a peer-to-peer, in which one or more computers serve simultaneously as servers and clients. A database 210 or databases, coupled to the server computer(s), stores much of the web pages and content exchanged between the user computers. The server computer(s), including the database(s), may employ security measures to inhibit malicious attacks on the system, and to preserve integrity of the messages and data stored therein (e.g., firewall systems, secure socket layers (SSL), password protection schemes, encryption, and the like).

The server computer 208 may include a server engine 212, a web page management component 214, a content management component 216 and a database management component 218. The server engine performs basic processing and operating system level tasks. The web page management component handles creation and display or routing of web pages. Users may access the server computer by means of a URL associated therewith. The content management component handles most of the functions in the embodiments described herein. The database management component includes storage and retrieval tasks with respect to the database, queries to the database, and storage of data such as video, graphics and audio signals.

Figure 3:
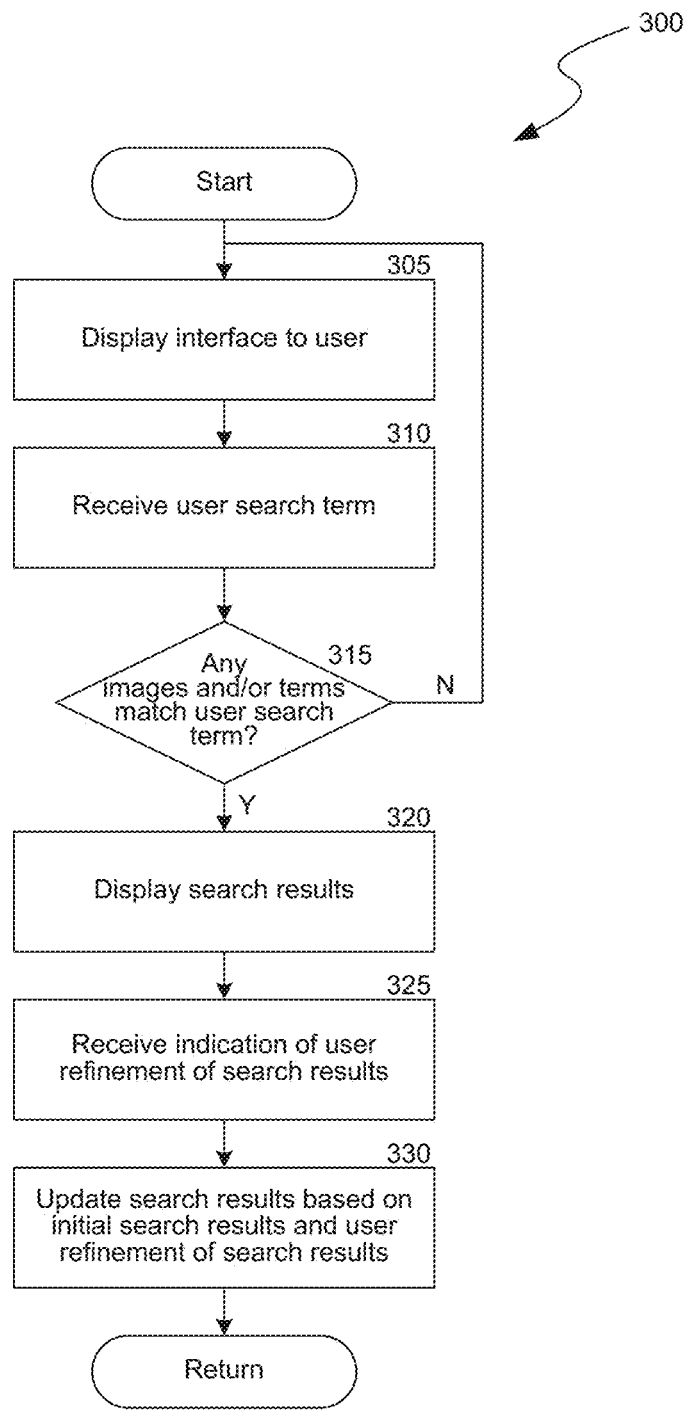
FIG. 3 is a flow diagram of a process for searching for images.

FIG. 3 is a flow diagram of a process 300 implemented by the facility to permit the user to submit an initial search for images and refine the initial search by specifying that some of the returned images and/or terms shall or shall not become part of a subsequent search. In step 305 the facility displays the interface to the user, with the interface including two or more of the search region, the Inspiration Palette, the Action Palette and the Reaction Palette. In step 310 the facility receives one or more search terms from the user. The facility disambiguates the one or more search terms by conforming or normalizing them to one or more terms in the structured vocabulary. The user then selects the appropriate structured vocabulary term. Alternatively, the user may start over and input one or more different search terms. After the user has selected the appropriate term from the structured vocabulary, the facility receives the selected term. In step 315 the facility determines if any images and/or terms match the selected term or are synonymous with the selected term. Matching may be an exact match, a close match, a fuzzy match, or other match algorithm. In step 320 the facility returns matching images and/or terms and displays the images and/or terms as described above. In step 325 the facility receives an indication from the user of a refinement of the initial search. In step 330 the facility updates the initial search results based on the initial search and the user refinement of the initial search.

Figure 4:
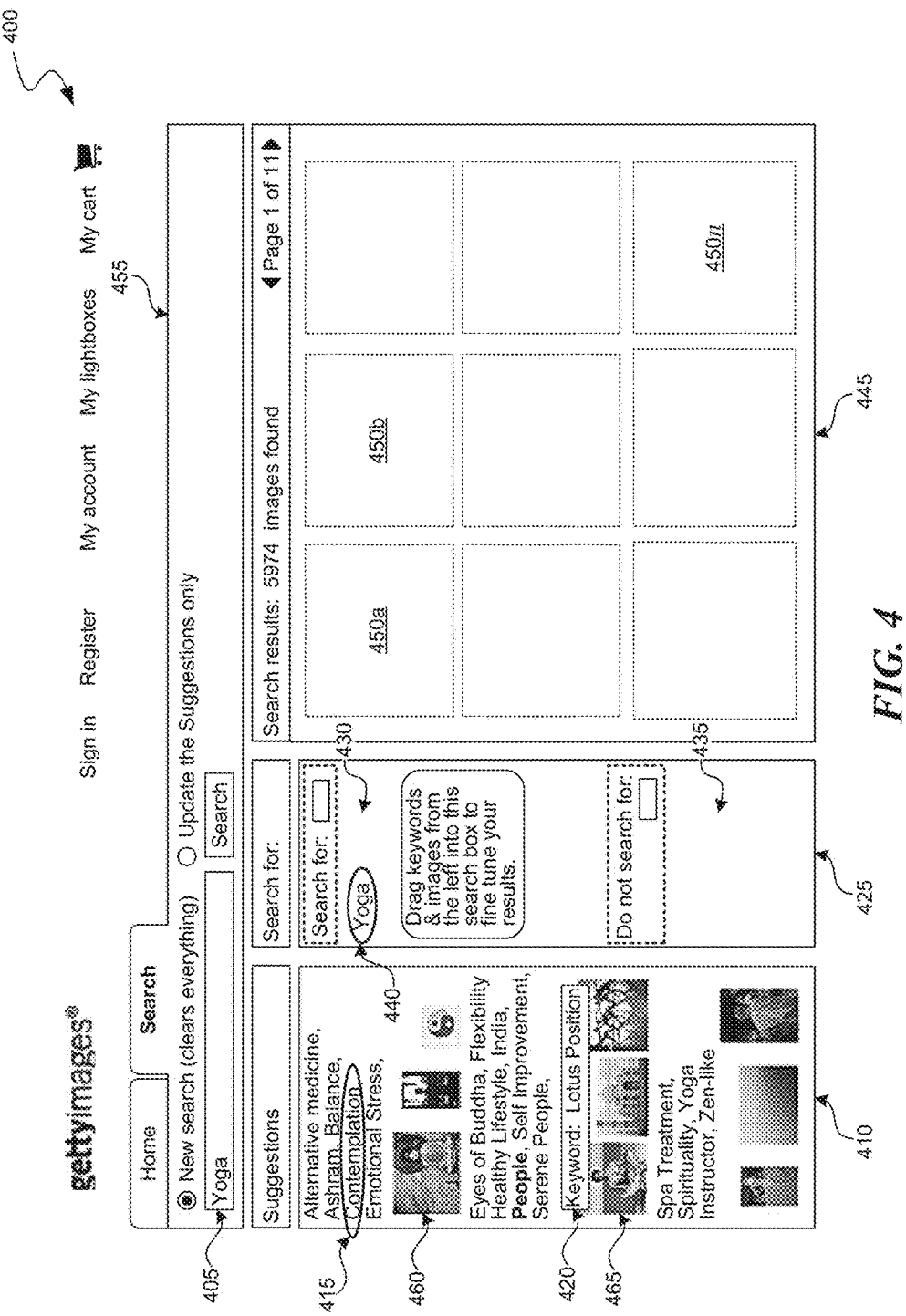
FIG. 4 depicts a representative interface.

FIG. 4 depicts a representative interface 400, which includes the search region 455 and the three additional regions described above. The user may specify one or more search terms in text box 405, located in search region 455. In this depiction the facility has returned images and terms that match the user search term "yoga," and placed the returned images and terms in Inspiration Palette 410. These images and terms include image 460 and term 415, which is displayed in a larger font size relative to that of surrounding terms. Inspiration Palette 410 also contains an image 465 for which an associated term 420 is displayed. Action Palette 425 is divided into two sub-regions 430 and 435. The user may place images and/or terms in sub-region 430 to specify that the facility is to add the associated terms to the initial search using a Boolean "AND." In this example term 440 is placed in sub-region 430. The user may also place images and/or terms in sub-region 435 to specify that the facility is to add the associated terms to the initial search using a Boolean "NOT." In some embodiments the interface includes a third sub-region (not shown) corresponding to a Boolean "OR." Reaction Palette 445 contains images (not shown) returned in response to an initial search and subsequent searches. These include images 450a, 450b ... through 450n.

FIG. 5A depicts another interface 500. The interface includes text box 505, in which the search term "yoga" has again been entered. The Inspiration Palette 510 contains images and terms returned in response to the search request. The Inspiration Palette has a scrollbar 535 that allows the user to scroll through all returned images and terms. In this interface the images and terms are ordered differently from the images and terms in FIG. 4. The Action Palette 525 contains the term "yoga" as well as an image, and the corresponding term 515 and image 520 in the Action Palette are highlighted to indicate to the user that they have been placed in the Action Palette. The Reaction Palette 530 contains images returned in response to the refinement of the initial search. There is also a scrollbar 540 that permits the user to scroll through images in the Reaction Palette. In some embodiments the facility may enable the user to paginate between pages of images in the Reaction Palette, or to shuffle or refresh the images.

FIG. 5B depicts the same interface 500 but with more images and terms in the Action Palette 525, indicating subsequent refinements of the user's initial search. Again, the terms and images in the Action Palette are highlighted in the Inspiration Palette 510. The Reaction Palette 530 in FIG. 5B contains a different set of images than the Reaction Palette depicted in FIG. 5A, illustrating that subsequent refinements to a search produces different results.

Figure 6:
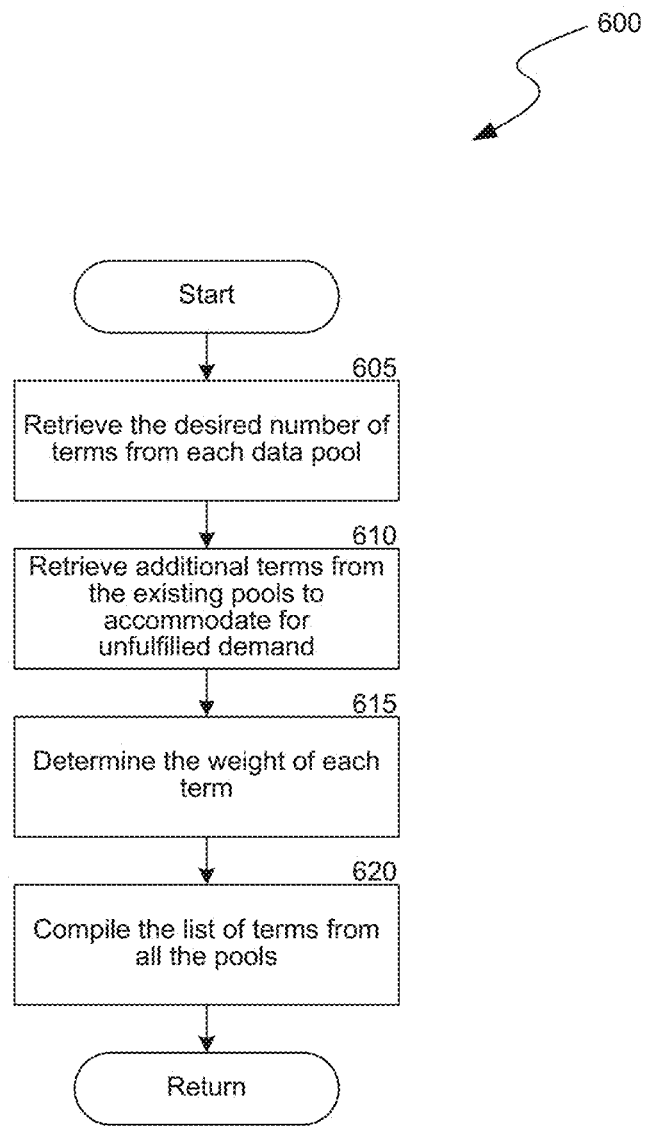
FIG. 6 is a flow diagram of a process for returning terms in response to a user search.

FIG. 6 is a flow diagram of a process 600 implemented by the facility for returning terms in response to a user search. The facility may make certain assumptions in implementing the process. The facility may assume that data pools are the sole sources of terms. The facility may assume that each data pool has a desired number of terms. The facility may assume that not all pools can supply enough terms to match the amount of terms desired to be taken from those pools. The facility may assume that demand is distributed to designated data pools or groups of data pools. The facility may assume that term weights may be assigned globally by popularity or, in some cases, within the data pool.

In step 605 the facility retrieves the desired number of terms from each data pool. The facility may pull the data from each of the desired data pools using appropriate filtering and sorting and/or a distribution model for data extraction. Data pools may be populated from the original data sources, data caches, or static lists. In step 610 the facility retrieves additional terms from the existing data pools to accommodate for unfulfilled demand. Unfulfilled demand may occur when a data pool does not have enough data to satisfy the initial request. For example, if a term has no children, the children data pool would have no data and any desired number of terms would become unfulfilled demand. In step 615 the facility determines the weight of each term, if the term is to be weighted. A term's weight may be dependent on its data pool. Specific data pools may provide weighted values and refinement terms indicate how many times they occur. Specific data pools may derive a constant weight and related terms may have a constant weight since they are manually assigned. A term may be given a score based upon the number of times it is assigned to images and weighted accordingly. A term may be given a score based upon being listed amongst the popular search terms and weighted accordingly. In step 620 the facility compiles a list of terms from all the data pools. The facility may combine the terms for use in the list. The facility may retain the original data pool and term weight for use in the display and organization of the terms.

In some embodiments the facility includes a configuration component that allows administrators of the facility to specify various aspects of the process for returning terms. The configuration component may allow administrators to fine-tune the process as well as enable administrators to evaluate the effectiveness of the process. The configuration component may allow administrators to specify, among other aspects: named sections for term data pools; a data pool from which to derive terms (from an existing set of available data pools); the desired number of terms to return; the maximum number of terms to use from specific data pools; and where the facility may retrieve additional terms if a specific data pool cannot meet the demand for terms from that data pool. The following depicts a sample configuration for the facility:

| Pool # | Name | Priority | Desired | Max | Floor | Ceiling |
|---|---|---|---|---|---|---|
| 1 | Term | 1 | 1 | 1 | n/a | n/a |
| 6 | Related Terms | 2 | 15 | 15 | 25% | 95% |
| 5 | Children | 3 | 2 | 4 | n/a | n/a |
| 2 | Parent | 4 | 1 | 1 | n/a | n/a |
| 7 | Refine: Subject | 5 | 10 | 15 | 25% | 95% |
| 8 | Refine: Concept | 6 | 10 | 15 | 25% | 95% |
| 4 | Siblings | 7 | 2 | 4 | n/a | n/a |
| 3 | Ancestors | 8 | 1 | 3 | n/a | n/a |
| Configurable | | yes | yes | yes | yes | yes |

In this sample configuration the "Pool #" refers to an identification number for the data pool. "Name" refers to the name of the data pool and may describe the relationship of the terms in the data pool to the search term entered by the user. "Priority" refers to the order in which the Inspiration Palette should be populated with terms from these data pools. "Desired" refers to the minimum number of terms that should be taken from the data pool if there is an adequate supply of terms within the data pool. A data pool's priority and desired settings may combine to specify that the facility is to return terms from lower priority data pools if the facility cannot obtain the desired number of terms from the data pool of that particular priority. "Max" refers to the maximum number of terms that should be taken from the particular data pool. "Floor" refers to the minimum percentage of the search results that term must be associated with in order for the facility to return the term for display in the Inspiration Palette. "Ceiling" refers to the maximum percentage of the search results that the term can be associated with in order for the facility to return the term for display in the Inspiration Palette. In embodiments where the Action Palette region contains an "OR" sub-region the configuration component may not use a ceiling. "Configurable" refers to the ability of the values in the various columns to be set by administrators of the facility. There may be additional columns and/or values to the configuration component that allow administrators to further configure the facility. The various data pools may have different requirements due to their characteristics and the configuration component allows for the different requirements to be taken into account. For example, the facility may select terms using a different process from different data pools, or may have different exclusions for different data pools.

Figure 7:
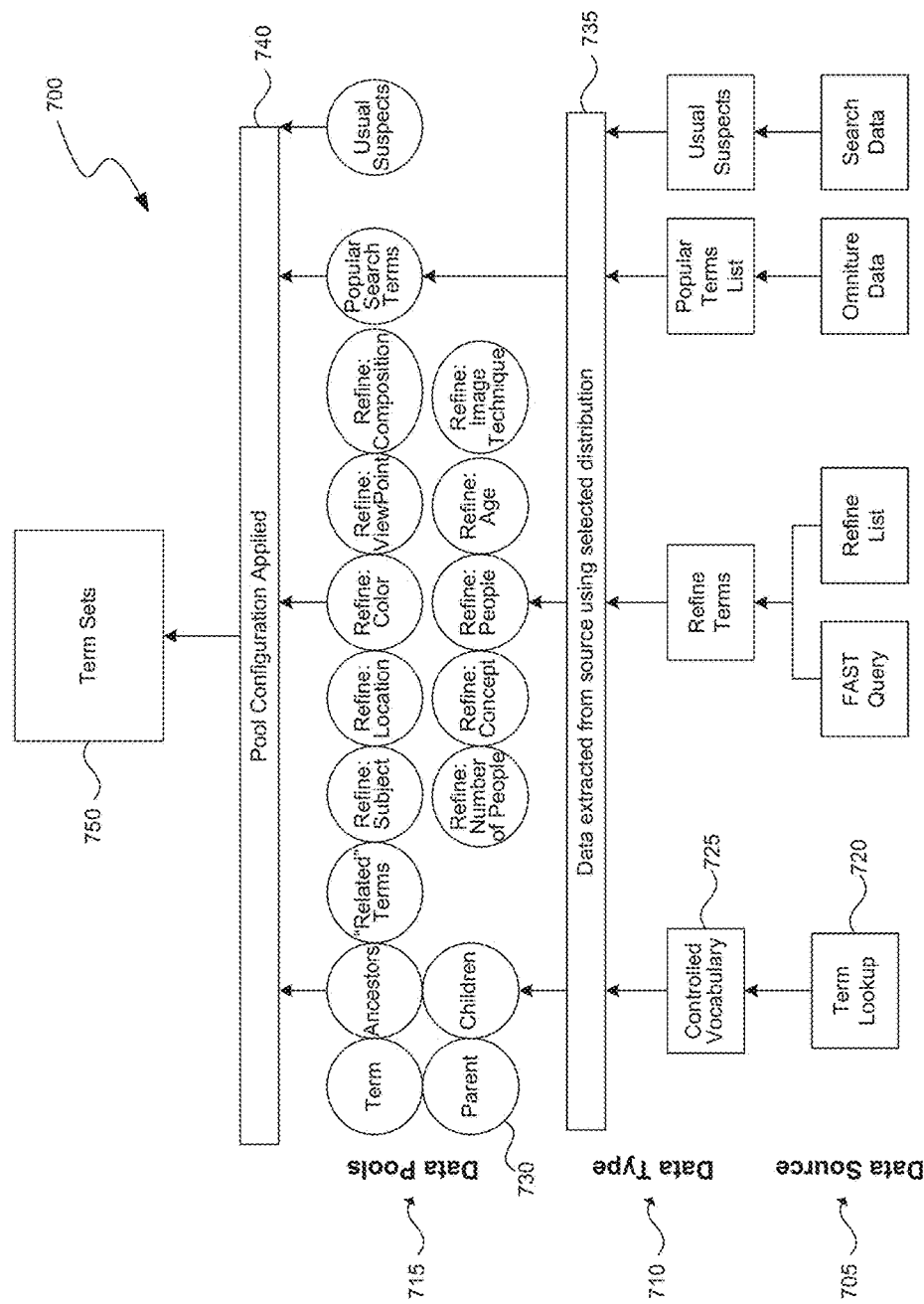
FIG. 7 is a schematic view of the composition of sets of terms.

FIG. 7 depicts a schematic view 700 of the composition of sets of terms according to some embodiments. Data sources 705, such as term lookup 720, provide different data types 710, such as controlled vocabulary 725. Data may be extracted from the data sources using selected distribution 735 and organized into different sets of data pools 715, such as parent 730. A configuration 740 may be applied to the data pools individually and/or as sets of data pools to form the sets of terms 750.

In some embodiments, the facility may cache sets of terms for specific periods of time. The facility may do so because the sets of terms may not change frequently. Caching sets of terms may enable the facility to quickly return images and/or terms in response to a user search. The facility may also cache the data in the data pools and/or the data in data sources. The facility may do so because this data may be expensive to gather, cheap to store, and it may change infrequently. The facility may also cache data at various other levels in order to improve system performance. For example, the facility may derive the data pools and/or the term sets prior to usage by performing data mining on the keyword data and other data sources. The data generated from this mining could then be formatted into a persistent data cache in order to provide a very fast access and an optimal user experience.

Figure 8A:
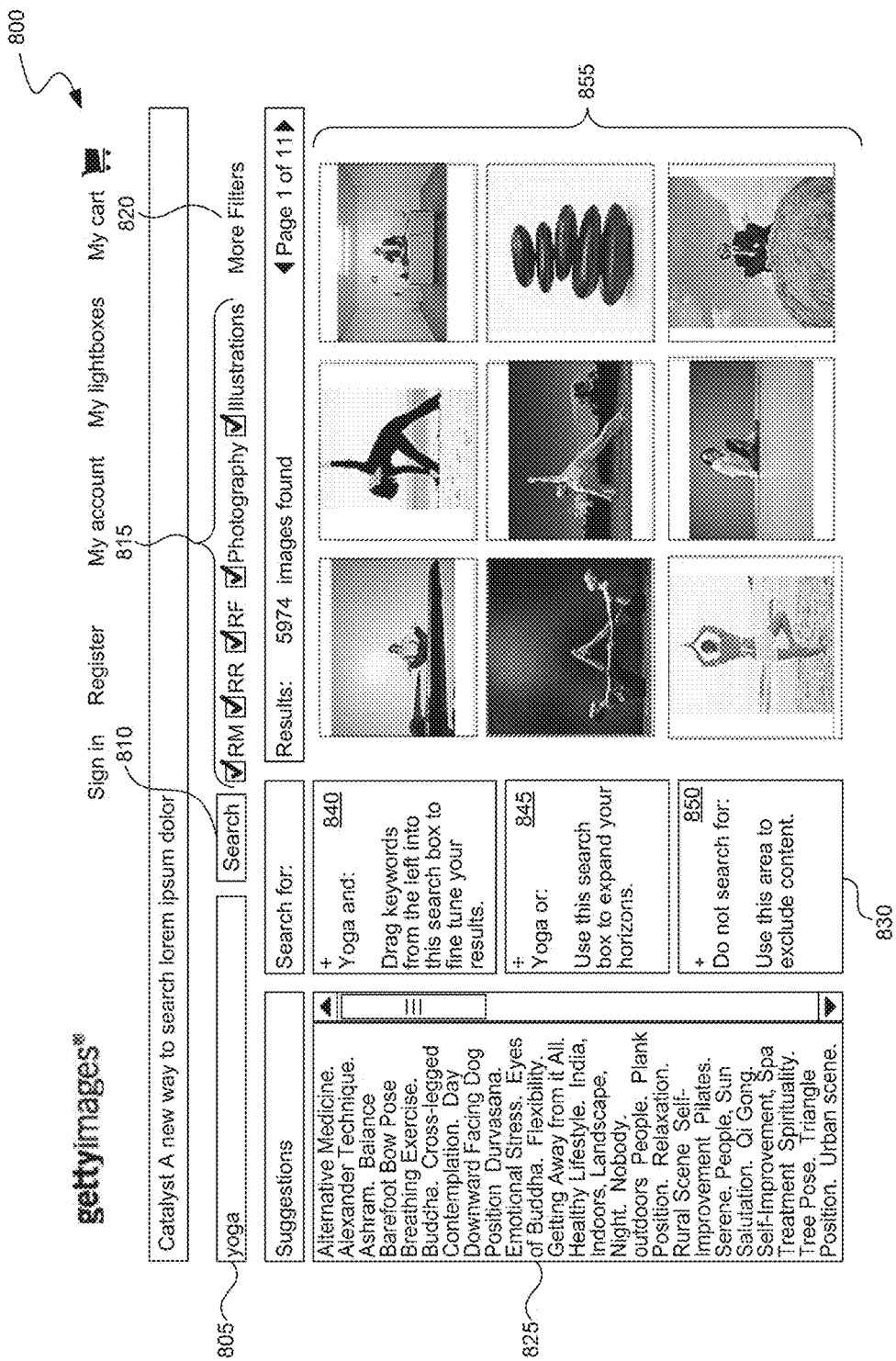
FIGS. 8A-8E depict an interface in accordance with some embodiments of the invention.
Figure 8B:
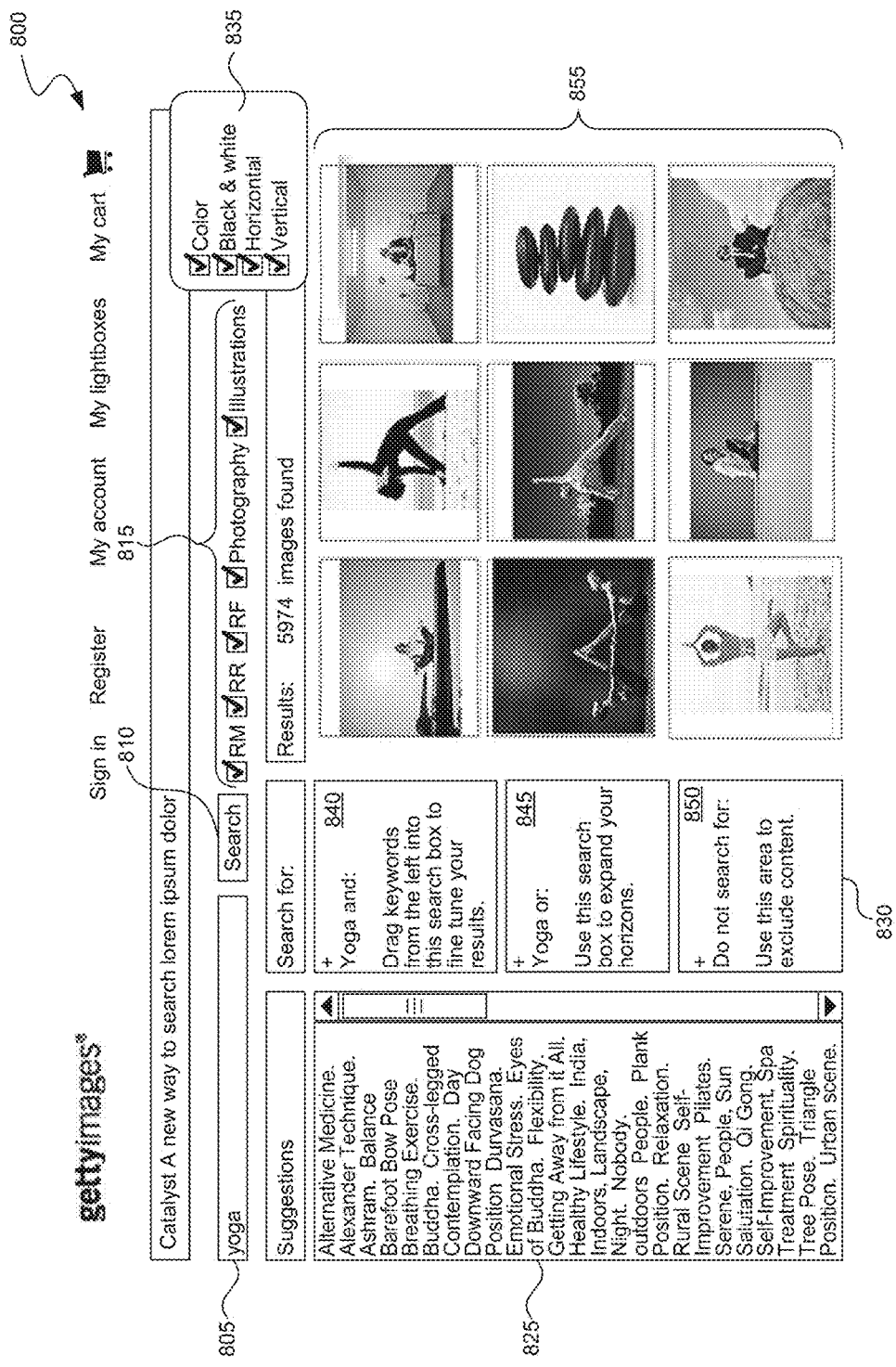

FIGS. 8A-8E depict an interface 800 in accordance with another embodiment of the invention. In FIG. 8A, the user may specify a search term in text box 805 and submit the search term by clicking the search button 810. In response to the user's search term, the facility has returned multiple terms for display in the Inspiration Palette 825. In this embodiment the facility has not returned images for display in the Inspiration Palette 825. The Action Palette 830 contains three sub-regions. Sub-region 840 corresponds to a Boolean "AND" and terms dragged-and-dropped into sub-region 840 will be added to the user's initial search using a Boolean "AND," which enables a user to refine an initial search. Sub-region 845 corresponds to a Boolean "OR" and terms dragged-and-dropped into sub-region 845 will be added to the user's initial search using a Boolean "OR," which enables a user to expand an initial search. Sub-region 850 corresponds to a Boolean "NOT" and terms dragged-and-dropped into sub-region 850 will be added to the user's initial search using a Boolean "NOT," which enables a user to exclude content. Images returned in response to the user's initial search and subsequent searches are displayed in the Reaction Palette 855. The interface 800 also contains a grouping of multiple check boxes 815, which enable a user to apply or remove display filters. The filters "RM," "RR," and "RF," which stand for "Rights-Managed," "Rights-Ready," and "Royalty-Free," respectively, as well as the filters "Photography," and "Illustrations" are configured as Boolean "OR" filters in the embodiment depicted in FIG. 8A. The facility will return and display images that satisfy any one of the filters specified in the check boxes 815. The interface 800 also contains a button 820 labeled "More Filters" which can enable a user to specify more ways to filter display results. For example, FIG. 8B depicts additional filters 835 that a user may select. The filters 835 include "Color," which if selected displays color images, "Black & White," which if selected displays black and white images, "Horizontal," which if selected displays images that have a horizontal or landscape orientation, and "Vertical," which if selected displays images that have a vertical or portrait orientation. Other filters are, of course, possible.

Figure 8C:
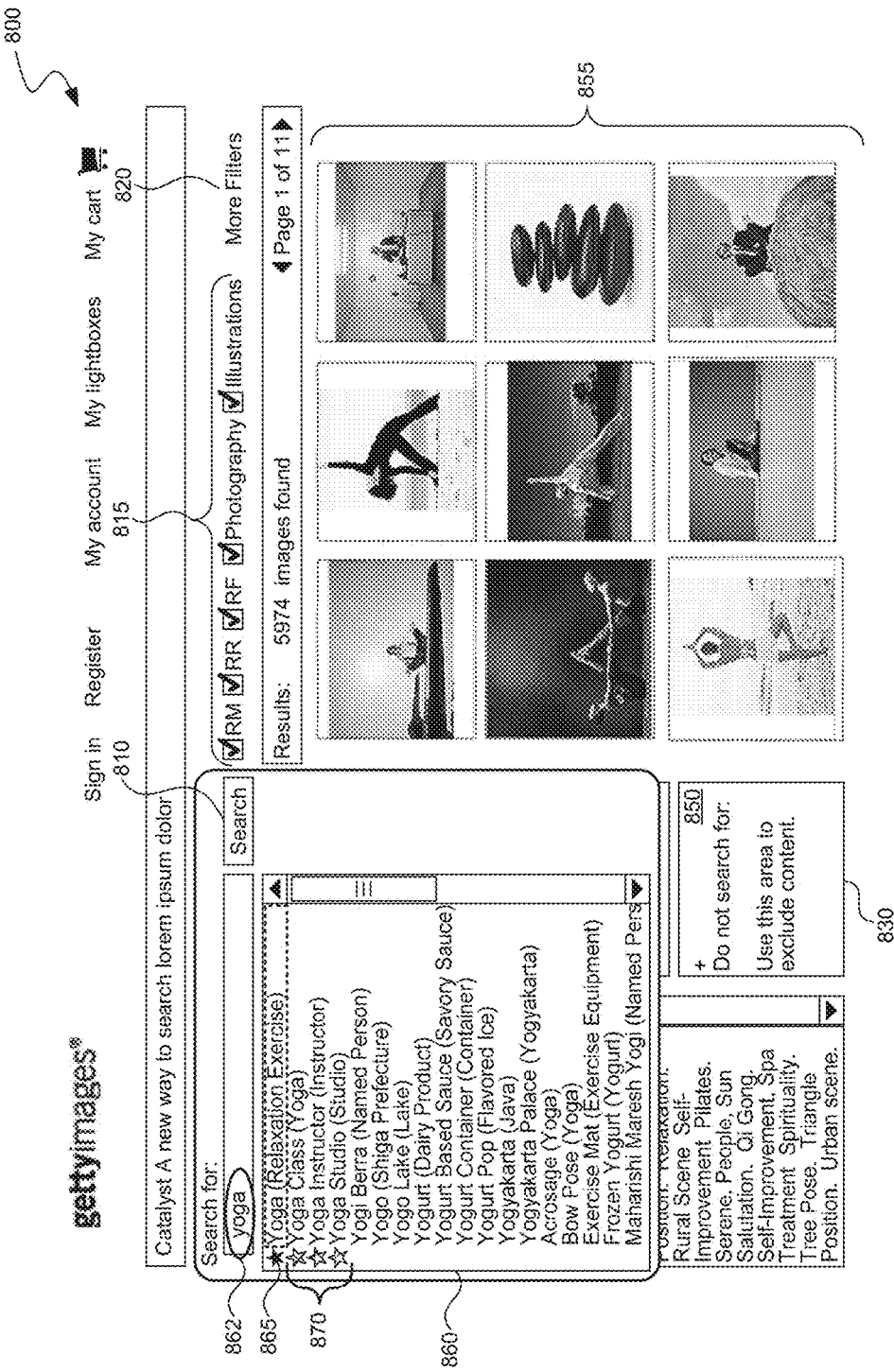

In FIG. 8C, the facility has suggested search terms in response to user input entered into text box 805. The facility displays search terms in the region 860 that may be associated with the search term "yoga" 862 entered by the user. In some embodiments, the facility may use, e.g., a colored star to indicate a direct match in the structured vocabulary or other factors or to indicate the best match to the user's input. For example, the facility has suggested the term 865 labeled "Yoga (Relaxation Exercise)" and marked the term 865 with a red star in response to the user's input of "yoga." The facility has also marked several other terms 870 with a grey star to indicate a more distant association with the user's input, as indicated by the structured vocabulary or other factors.

Figure 8D:
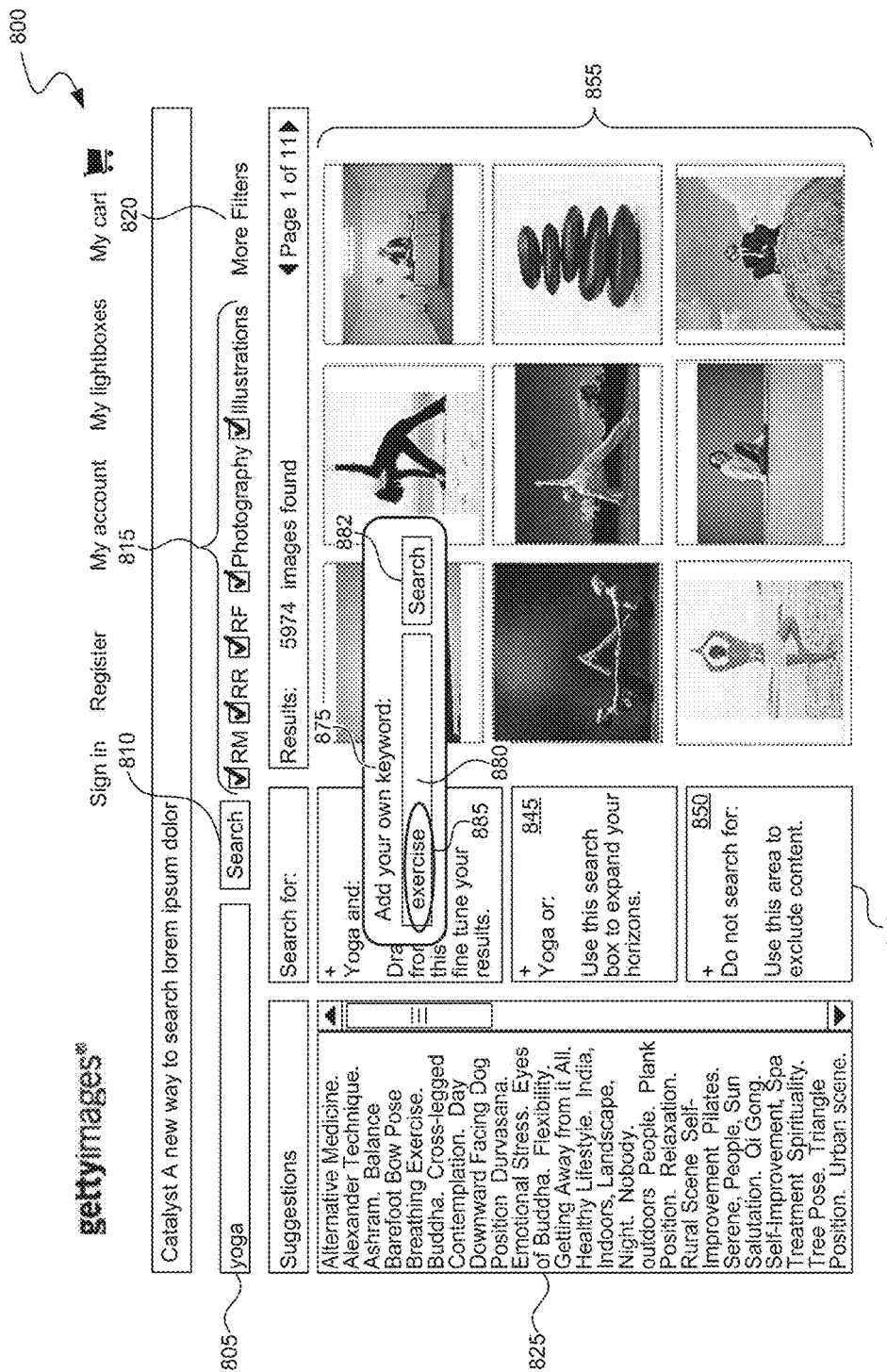

FIG. 8D depicts a region 875 that the facility displays in response to a user indication such as a mouse click within the sub-region 840 of the Action Palette 830. The region 875 contains a text box 880 that allows a user to type an additional search term, such as the term "exercise" 885. The user may wish to type in an additional search term, for example, if the user does not find appropriate terms in the Inspiration Palette 825 that the user desires to use to modify the user's initial search. The user can similarly add search terms to the other sub-regions 845 and 850 of the Action Palette 830. When the user clicks the search button 882 the facility adds the search term 885 to the user's initial search using the appropriate Boolean connector and returns and displays images and/or terms returned by the modified initial search.

Figure 8E:
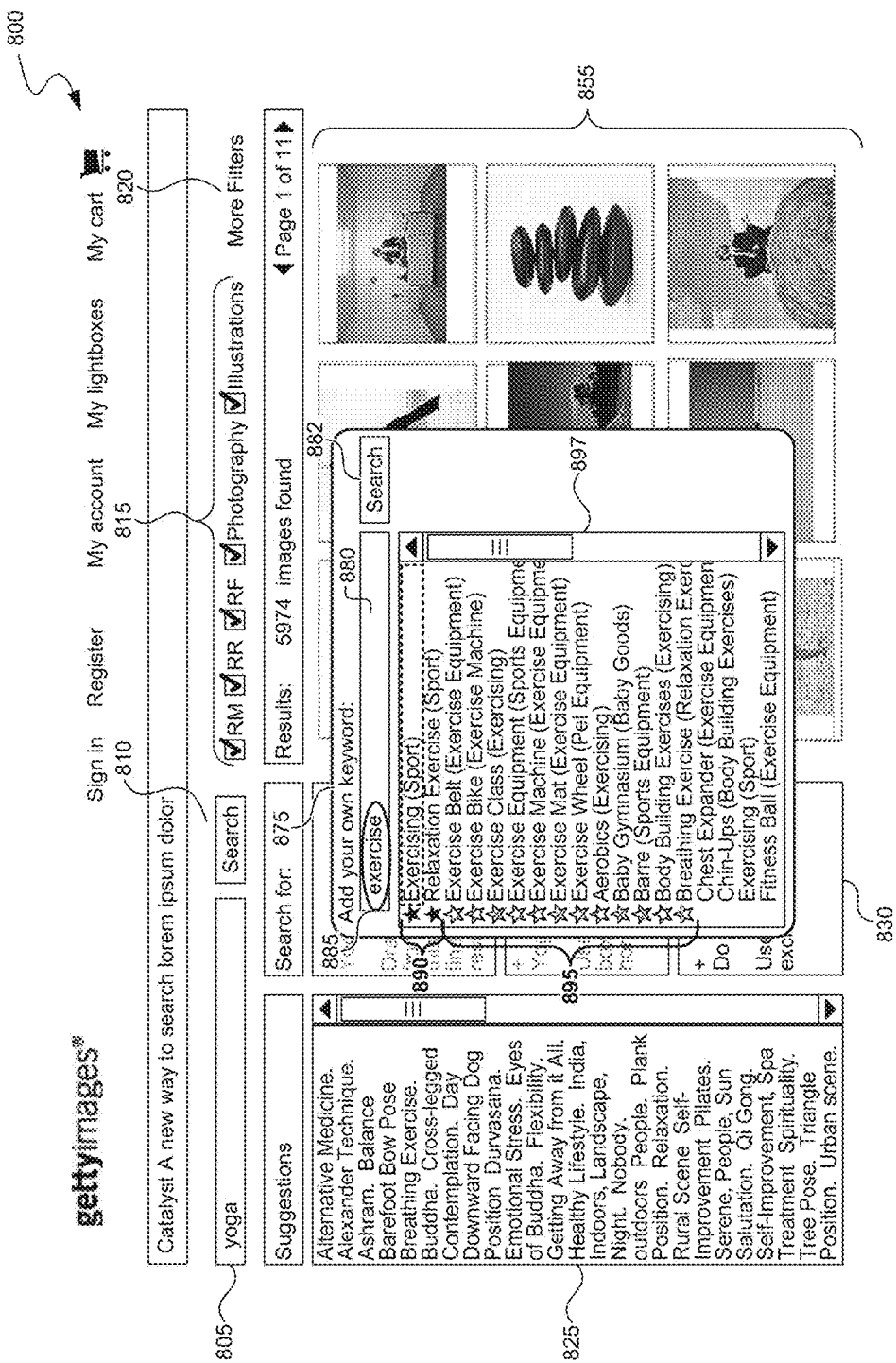

In FIG. 8E, the facility has suggested search terms in response to user input entered into text box 880. The facility displays search terms in the region 897 that may be associated with the search term "exercise" 885 entered by the user. Similar to the description of FIG. 8C, the facility uses a red star to mark the terms 890 that optimally correspond to the user's search term "exercise" 885, as indicated by the structured vocabulary or other factors. Additional search terms 895 may be marked with a grey star to indicate a more distant association with the user's input, as indicated by the structured vocabulary or other factors.

Figure 9A:
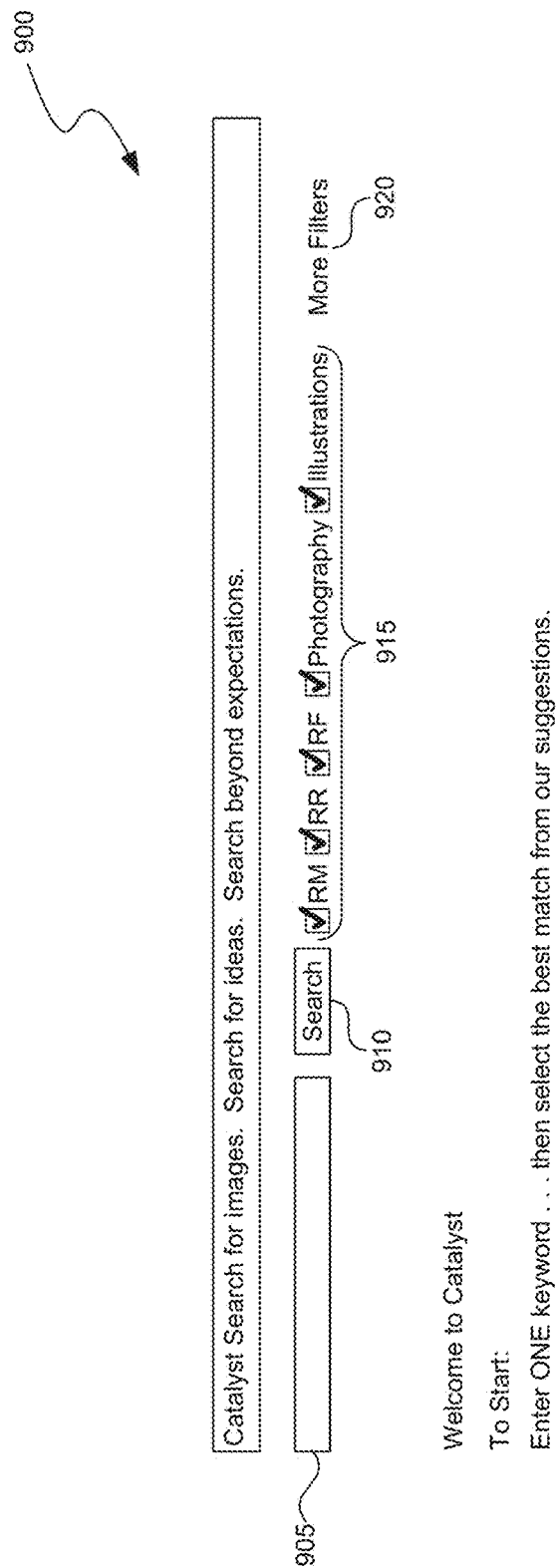
FIGS. 9A-9E depict an interface in accordance with some embodiments of the invention.
Figure 9B:
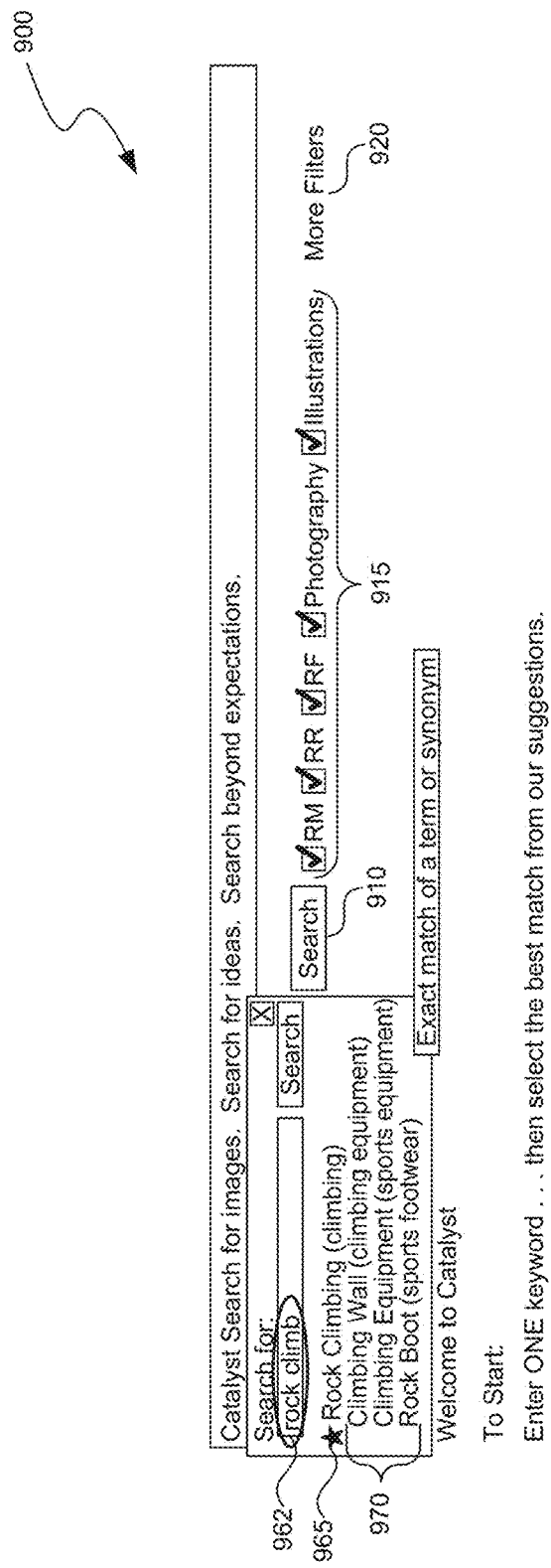
Figure 9C:
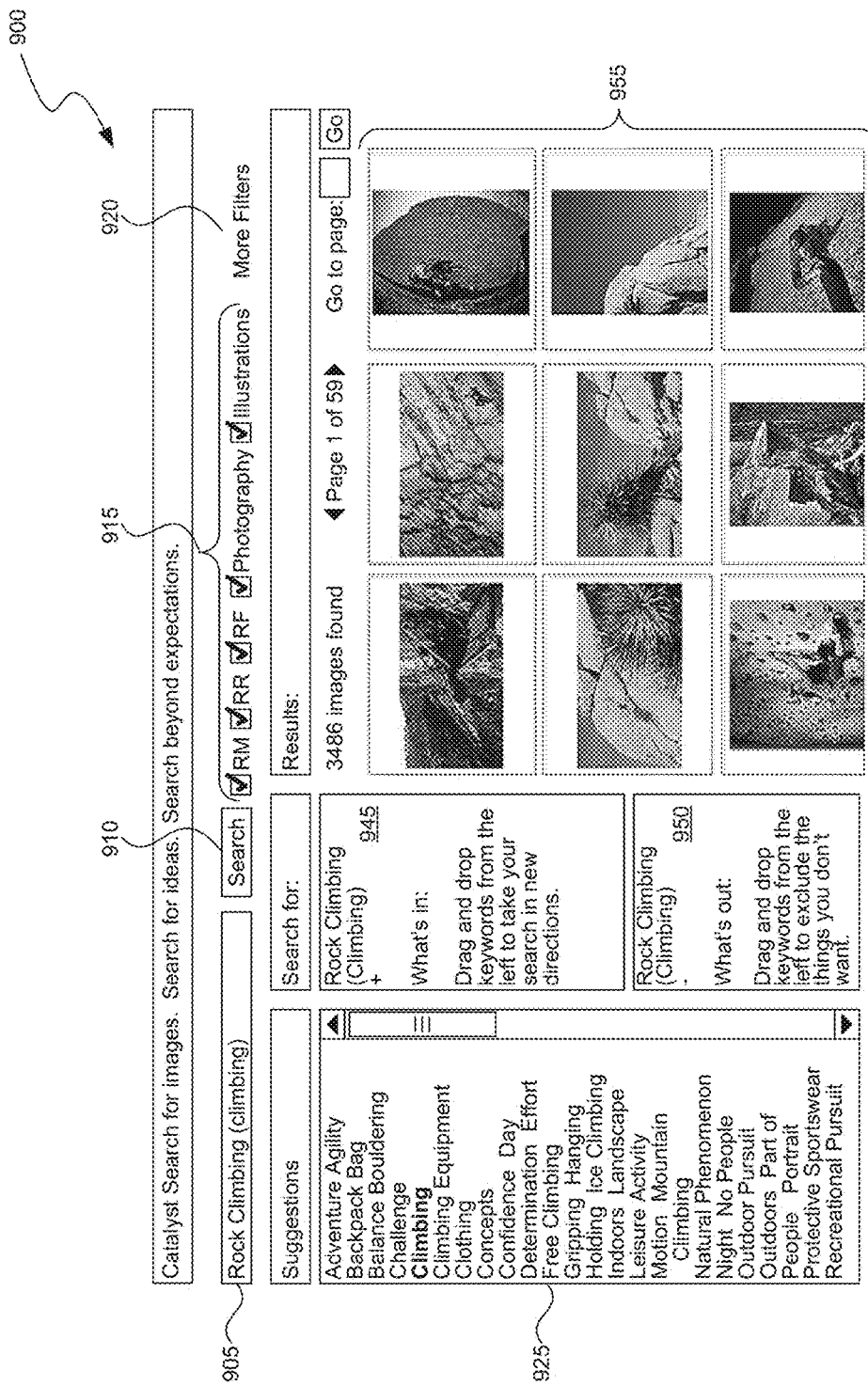

FIGS. 9A-9E depict interfaces in accordance with another embodiment of the invention. FIG. 9A depicts an interface 900 that enables a user to provide a keyword in search box 905 and select the suggested keyword that best matches the concept or idea for which user intends to search for images. FIG. 9B depicts the interface 900 showing that the user has entered the words "rock climb" 962 into search box 905. The facility has disambiguated the user-entered words 962 by conforming or normalizing them to a term in the structured vocabulary and has suggested four keywords in response: "Rock Climbing (Climbing)" 965, "Climbing Wall (Climbing Equipment)," "Climbing Equipment (Sports Equipment)" and "Rock Boot (Sports Footwear)" (the latter three keywords collectively labeled 970). The star next to the keyword "Rock Climbing (Climbing)" 965 indicates that the facility has determined that this keyword optimally matches or corresponds to the user's search term "rock climb." FIG. 9C depicts the interface 900 showing the facility's response to the user's selection of the keyword "Rock Climbing (Climbing)" 962. The Inspiration Palette region 925 contains keywords suggested by the facility, such as keywords determined by the process 600 illustrated in FIG. 6 (e.g., keywords from the structured vocabulary that have an ancestor or descendant relation to the keyword "Rock Climbing (Climbing)," in addition to other keywords.) The Action Palette contains two sub-regions: one sub-region 945 into which the user may drag-and-drop keywords from the Inspiration Palette region 925 to take the user's search for images in a new direction; and one sub-region 950 into which the user may drag-and-drop keywords from the Inspiration Palette region 925 to exclude images having those associated keywords. The Reaction Palette region 955 displays a set of images having the keyword "Rock Climbing (Climbing)" associated with them that the facility has retrieved (e.g., those images having the keyword "rock climbing" associated with them).

Figure 9D:
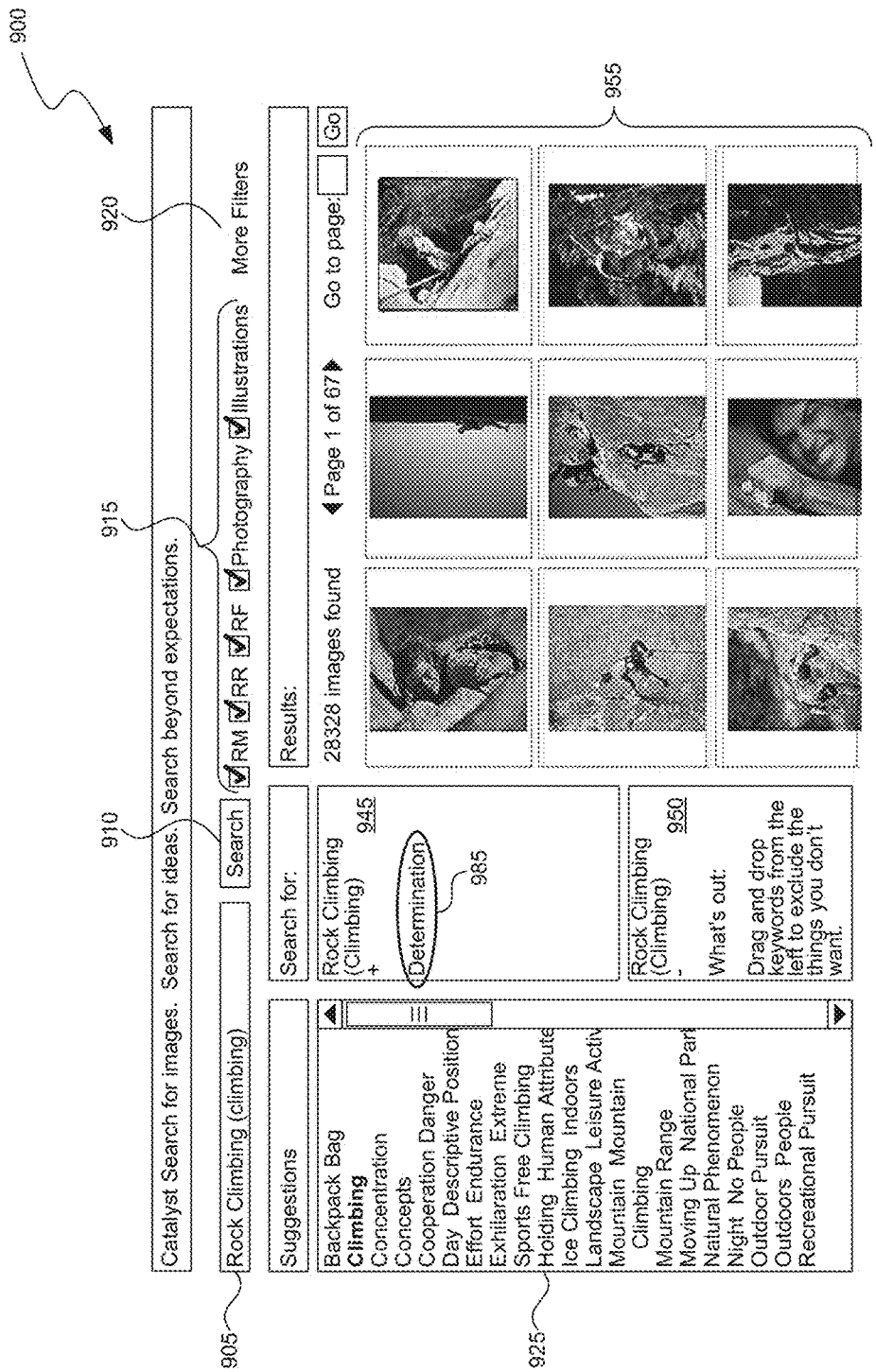
Figure 9E:
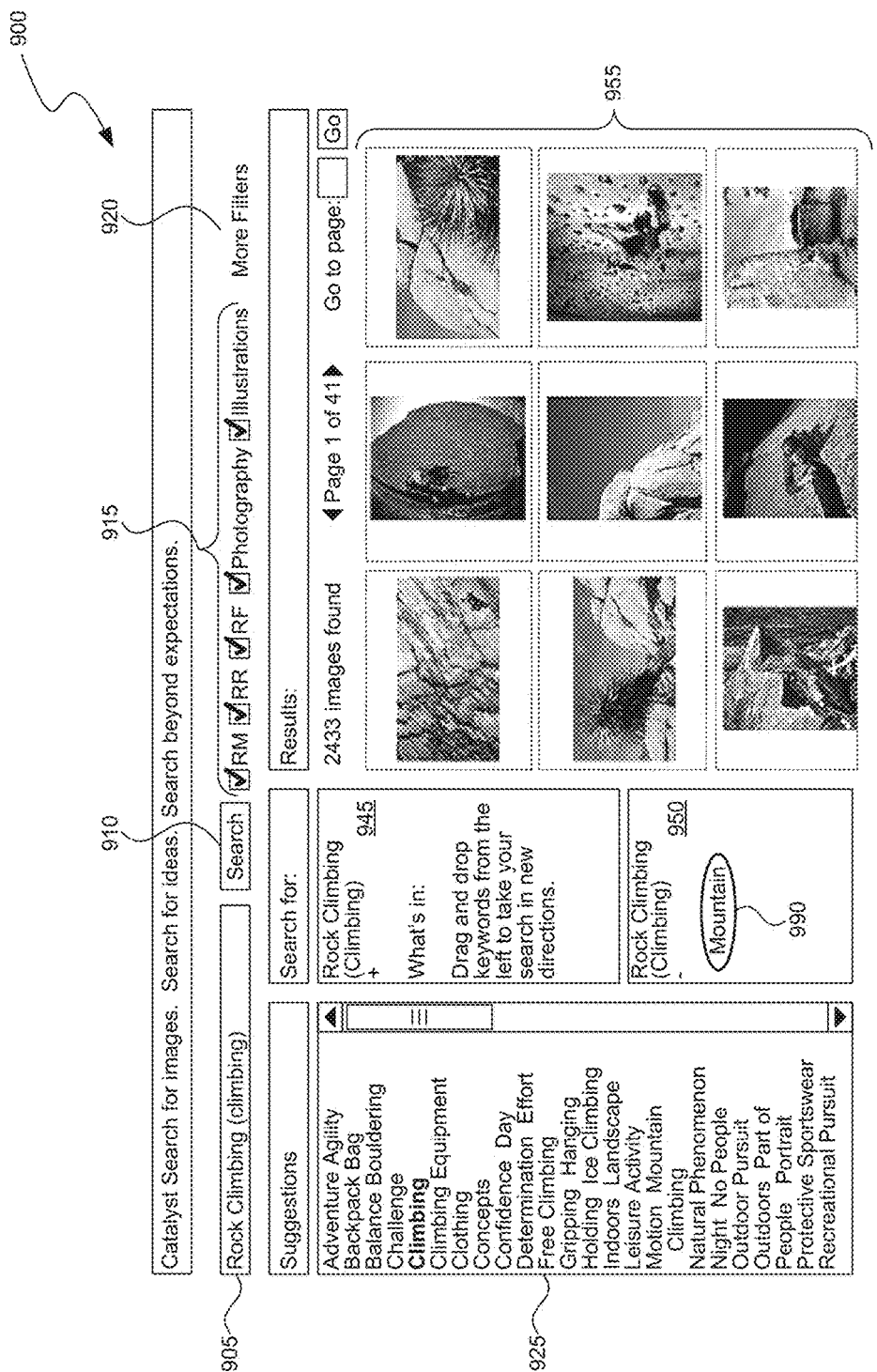

FIG. 9D depicts the interface 900 showing the facility's response to the user having dragged-and-dropped the keyword "Determination" 965 into the first sub-region 945 in the Action Palette. The facility has provided a new set of images in response to the selection of the keyword "Determination" 965 for display in the Reaction Palette region 955. FIG. 9E depicts the interface 900 presented in response to the user having dragged-and-dropped the keyword "Mountain" 970 into the second sub-region 950 in the Action Palette. The facility has narrowed the set of images displayed in the Reaction Palette region 955 by excluding those images having the keyword "Mountain" 970 associated with them.

Conclusion

The foregoing description details certain embodiments of the invention. It will be appreciated, however, that no matter how detailed the foregoing appears in text, the invention can be practiced in many ways. For example the user search pages are described in the context of a Web base environment, with the search/results pages being accessed via a Web browser. The methods and processes could equally well be executed as a standalone system Furthermore, although the user desired features are described in the context of copy space requirements, other features in an image could also be searched, where a predetermined pixel variation can be identified. Although the subject matter has been described in language specific to structural features and/or methodological steps, it is to be understood that the subject matter defined in the appended claims is not necessarily limited to the specific features or steps described. Rather, the specific features and steps are disclosed as preferred forms of implementing the claimed subject matter.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the invention provided herein can be applied to other systems, not necessarily the system described above. The elements and acts of the various embodiments described above can be combined to provide further embodiments. Any patents and applications and other references noted above, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the final claims.

We claim:

1. A method for identifying digital assets in response to a refined search query, the method comprising:
   receiving, at a computing system, an initial search query from a user system for locating at least one digital asset from a database of digital assets, wherein each digital asset in the database of digital assets is associated with at least one keyword, and wherein each associated keyword is part of a structured vocabulary of hierarchically organized keywords maintained by the computing system;

determining a first set of digital assets from the database of digital assets, wherein each digital asset in the first set of digital assets is associated with a keyword equivalent to or synonymous with the initial search query;

determining a first set of suggested keywords from the structured vocabulary, wherein each suggested keyword in the first set of suggested keywords has a relationship in the hierarchical organization to the initial search query, the relationship existing prior to receiving the initial search query;

transmitting the first set of digital assets and the first set of suggested keywords to the user system;

receiving, at the computing system, a refinement selection from the user system, wherein the refinement selection comprises a refinement digital asset from the first set of digital assets or a refinement keyword from the first set of suggested keywords;

generating a refined search query based on the initial search query and the refinement selection;

determining a second set of digital assets from the database of digital assets, wherein each digital asset in the second set of digital assets is associated with a keyword equivalent to or synonymous with the refined search query;

determining a second set of suggested keywords from the structured vocabulary, wherein each suggested keyword in the second set of suggested keywords has a relationship in the hierarchical organization to the refined search query, the relationship existing prior to receiving the refined search query; and transmitting the second set of digital assets and the second set of suggested keywords to the user system.

2. The method of claim 1, wherein at least one keyword of the first set of suggested keywords or one keyword of the second set of suggested keywords has a concept or subject in common with the search query.

3. The method of claim 1, wherein at least one keyword of the first set of suggested keywords or one keyword of the second set of suggested keywords is a popularly searched keyword.

4. The method of claim 1, wherein each keyword of the first set of suggested keywords is associated with a weighting based on a nearness between the keyword and the search query in the structured vocabulary.

5. The method of claim 4, wherein each keyword is displayed to a user at the user system based on the weighting associated with the keyword.

6. The method of claim 1, wherein the second set of digital assets includes at least one digital asset that is not included in the first set of digital assets.

7. The method of claim 1, wherein the refinement selection is associated with a Boolean operator specified by a user of the user system, and wherein the refinement search query is further based on the Boolean operator.

8. A non-transitory computer-readable medium encoded with a computer program to identify digital assets, the computer program including instructions to perform a method comprising:

receiving, at a computing system, a first search query from a user system for locating at least one digital asset from a database of digital assets, wherein each digital asset in the database of digital assets is associated with at least one keyword, and wherein each associated keyword is part of a structured vocabulary of hierarchically organized keywords maintained by the computing system;

determining a first set of digital assets from the database of digital assets, wherein each digital asset in the first set of digital assets is associated with a keyword equivalent to or synonymous with the first search query;

determining a first set of suggested keywords from the structured vocabulary, wherein each suggested keyword in the first set of suggested keywords has a relationship in the hierarchical organization to the first search query, the relationship existing prior to receiving the first search query;

transmitting the first set of digital assets and the first set of suggested keywords to the user system;

receiving, at the computing system, a refinement selection from the user system, wherein the refinement selection comprises a refinement digital asset from the first set of digital assets or a refinement keyword from the first set of suggested keywords;

generating a refined search query based on the search query and the refinement selection;

determining a second set of digital assets from the database of digital assets, wherein each digital asset in the second set of digital assets is associated with a keyword equivalent to or synonymous with the refined search query;

determining a second set of suggested keywords from the structured vocabulary, wherein each suggested keyword in the second set of suggested keywords has a relationship in the hierarchical organization to the refined search query, the relationship existing prior to receiving the refined search query; and transmitting the second set of digital assets and the second set of suggested keywords to the user system.

9. The non-transitory computer-readable medium of claim 8, wherein at least one keyword of the first set of suggested keywords or one keyword of the second set of suggested keywords has a concept or subject in common with the search query.

10. The non-transitory computer-readable medium of claim 8, wherein at least one keyword of the first set of suggested keywords or one keyword of the second set of suggested keywords is a popularly searched keyword.

11. The non-transitory computer-readable medium of claim 8, wherein each keyword of the first set of suggested keywords is associated with a weighting based on a nearness between the keyword and the search query in the structured vocabulary.

12. The non-transitory computer-readable medium of claim 11, wherein each keyword is displayed to a user at the user system based on the weighting associated with the keyword.

13. The non-transitory computer-readable medium of claim 8, wherein the second set of digital assets includes at least one digital asset that is not included in the first set of digital assets.

14. The non-transitory computer-readable medium of claim 8, wherein the refinement selection is associated with a Boolean operator specified by a user of the user system, and wherein the refinement search query is further based on the Boolean operator.

15. A computer system for providing digital assets in response to searches for digital assets, the system comprising:
- a database; and
- a server computer coupled to the database and executing instructions that, when executed:
  - store multiple keywords, wherein each keyword is part of a structured vocabulary of hierarchically organized keywords; and
  - store multiple digital assets, wherein each digital asset is associated with at least one keyword;
  - receive a first search query from a user system for locating at least one digital asset from the database of digital assets;
  - determine a first set of digital assets from the database of digital assets, wherein each digital asset in the first set of digital assets is associated with a keyword equivalent to or synonymous with the first search query;
  - determine a first set of suggested keywords from the structured vocabulary, wherein each suggested keyword in the first set of suggested keywords has a relationship in the hierarchical organization to the first search query, the relationship existing prior to receiving the first search query;
  - transmit the first set of digital assets and the first set of suggested keywords to the user system;
  - receive a refinement selection from the user system, wherein the refinement selection comprises a refinement digital asset from the first set of digital assets or a refinement keyword from the first set of suggested keywords;
  - generate a refined search query based on the search query and the refinement selection;
  - determine a second set of digital assets from the database of digital assets, wherein each digital asset in the second set of digital assets is associated with a keyword equivalent to or synonymous with the refined search query;
  - determine a second set of suggested keywords from the structured vocabulary, wherein each suggested keyword in the second set of suggested keywords has a relationship in the hierarchical organization to the refined search query, the relationship existing prior to receiving the refined search query; and
  - transmit the second set of digital assets and the second set of suggested keywords to the user system.

16. The computer system of claim 15, wherein at least one keyword of the first set of suggested keywords or one keyword of the second set of suggested keywords has a concept or subject in common with the search query.

17. The computer system of claim 15, wherein at least one keyword of the first set of suggested keywords or one keyword of the second set of suggested keywords is a popularly searched keyword.

18. The computer system of claim 15, wherein each keyword of the first set of suggested keywords is associated with a weighting based on a nearness between the keyword and the search query in the structured vocabulary.

19. The computer system of claim 18, wherein each keyword is displayed to a user at the user system based on the weighting associated with the keyword.

20. The computer system of claim 15, wherein the second set of digital assets includes at least one digital asset that is not included in the first set of digital assets.

21. The computer system of claim 15, wherein the refinement selection is associated with a Boolean operator specified by a user of the user system, and wherein the refinement search query is further based on the Boolean operator.

* * * * *